US011668562B1

(12) United States Patent
Grier et al.

(10) Patent No.: US 11,668,562 B1
(45) Date of Patent: Jun. 6, 2023

(54) GPS-BASED SPATIAL MEASUREMENTS

(71) Applicant: META PLATFORMS, INC., Menlo Park, CA (US)

(72) Inventors: Andrew Todd Grier, Philadelphia, PA (US); Andreas Gros, San Francisco, CA (US); Tobias Gerard Tiecke, Redwood City, CA (US)

(73) Assignee: META PLATFORMS, INC., Menlo Park, CA (US)

( * ) Notice: Subject to any disclaimer, the term of this patent is extended or adjusted under 35 U.S.C. 154(b) by 269 days.

(21) Appl. No.: 17/119,773

(22) Filed: Dec. 11, 2020

Related U.S. Application Data

(60) Provisional application No. 62/948,149, filed on Dec. 13, 2019.

(51) Int. Cl.
*G01C 5/00* (2006.01)
(52) U.S. Cl.
CPC ...................................... *G01C 5/00* (2013.01)
(58) Field of Classification Search
CPC ....................................................... G01C 5/00
See application file for complete search history.

(56) References Cited

FOREIGN PATENT DOCUMENTS

| CA | 2604656 A1 * | 4/2008 | ............ G01C 21/32 |
|----|--------------|--------|------------------------|
| WO | WO-2021001489 A1 * | 1/2021 | ............ G01S 19/07 |
| WO | WO-2021101612 A2 * | 5/2021 | ............ G06T 7/579 |

OTHER PUBLICATIONS

SiRF, NMEA Reference Manual, Jan. 2005, Revision 1.3, 27 pages.

* cited by examiner

*Primary Examiner* — Bernarr E Gregory
*Assistant Examiner* — Fred H Mull
(74) *Attorney, Agent, or Firm* — Artegis Law Group, LLP

(57) ABSTRACT

Various embodiments of the present application set forth a computer-implemented method comprising aggregating positional signals that were received from device sensors, where each positional signal has an observed signal strength, identifying a subset of the positional signals, where each positional signal in the subset was received by a device sensor while the device sensor was located within the physical location, for each positional signal, generating, by an estimation device and based at least on a position of the device sensor, an approximate object height for an object located at the physical location, for each approximate object height, determining an expected signal strength for the positional signal corresponding to the approximate object height, generating a cost value that is based on a difference between the expected signal strength and the observed signal strength, and determining, by the estimation device and based on the cost values, an estimated object height.

20 Claims, 11 Drawing Sheets

| SIGNAL GROUP 310 | STRENGTH (expected) 312 | STRENGTH (observed) 314 | ATTENUATION 316 | TIME (observed) 318 | ANGLES (θ, Φ) 320 | OBJECT HEIGHT (meters) 322 |
|---|---|---|---|---|---|---|
| 1 | 55 | 55 | 0 | .05 | 40, 20 | 6.5 |
| 2 | 46 | 40 | 6 | .08 | 80, 12 | 10 |
| 3 | 60 | 42 | 18 | .06 | 30, 30 | 11.5 |
| 4 | 31 | 0 | 31 | — | 20, 45 | 9 |
| 5 | 40 | 0 | 40 | — | 15, 42 | 3 |
| 6 | 60 | 58 | 2 | .03 | 75, 75 | 12 |

FIG. 3

GPS-BASED SPATIAL MEASUREMENTS

CROSS-REFERENCE TO RELATED APPLICATIONS

This application claims priority benefit of the United States Provisional Patent Application titled, "GPS-BASED SPATIAL MEASUREMENTS," filed on Dec. 13, 2019 and having Application No. 62/948,149. The subject matter of this related application is hereby incorporated herein by reference.

BACKGROUND

Field of the Embodiments

The present invention relates generally to signal processing, and more specifically, to GPS-based spatial measurements.

Description of the Related Art

Various spatial information systems include devices that determine spatial information about a target area. One such system may be a radar system, where various devices transmit electromagnetic signals in order to gather information about a target area. For example, the radar system includes transmitters that emit electromagnetic signals that travel through a target area and interact with objects in the transmission area, such as reflecting on one or more objects, before returning to a receiver. The system then analyzes information about the received electromagnetic signals in order to determine spatial information about the target area, such as the positions of objects included in the target area. The system may then generate radar images, which can be further processed in order to determine specific spatial information about the included objects. For example, a device communicating with the radar system may receive a radar image as an input and may, based on analyzing the radar image, infer the shape and dimensions of multiple objects included in the radar image.

One drawback of conventional techniques for determining spatial data for objects based on image data is that the images used as inputs may not include the requisite data to accurately determine the dimensions of objects included in the images. For example, a radar system may generate low-resolution radar images from the collected information associated with the received electromagnetic signals. As a result, a device analyzing the low-resolution radar image may not be able to determine accurate dimensions for objects included in the radar image. Consequently, the device is not able to generate accurate distance measurements from the radar image and thus, may not accurately measure the dimensions of objects within the image.

SUMMARY

Various embodiments of the present application set forth a computer-implemented method comprising aggregating positional signals that were received, via a network, from a plurality of device sensors, wherein each positional signal has an associated observed signal strength, identifying a subset of the positional signals associated with a physical location, where each positional signal included in the subset of the positional signals was received by a given device sensor while the device sensor was located within a threshold distance of the physical location, for each positional signal included in the subset of the positional signals, generating, by an estimation device and based at least on a position of the device sensor that received the positional signal, a corresponding approximate object height for an object located at the physical location, for each approximate object height corresponding to the subset of the positional signals, determining an expected signal strength for the positional signal corresponding to the approximate object height, generating, by the estimation device, a cost value that is based on a difference between the expected signal strength and the observed signal strength associated with the positional signal corresponding to the approximate object height, and determining, by the estimation device and based on the cost values, an estimated object height for the object.

Various embodiments of the present application set forth a computer-implemented method comprising aggregating, by an estimation device, positional signals that were received from a plurality of device sensors, wherein each positional signal has an associated signal strength, generating, by the estimation device from the aggregated set of the positional signals, an aggregated set of signal strengths, determining, from the aggregated set of signal strengths, a first classification threshold, after determining the first classification threshold, receiving, by the estimation device, a first positional signal that is not included in the aggregated set of the positional signals, wherein the first positional signal has an associated first signal strength, comparing the first positional signal to the first classification threshold, and when the first signal strength is above the first classification threshold, classifying the first positional signal as being received by the sensor device while outdoors, or when the first signal strength is below the first classification threshold, classifying the first positional signal as being received by the sensor while indoors.

At least one technological advantage of the disclosed techniques relative to prior techniques is that the system is able to aggregate a large volume of measurements associated with satellite-based positional signals in order to determine spatial information. Aggregating such data enables the system to provide highly accurate estimations about the location of sensors, as well as other objects within a target area. Consequently, the system is able to use an aggregate of estimated dimensional values in order to provide precise estimated heights of objects. Further, the system is able to provide accurate classifications about the position of a sensor based on previous sensor data.

DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 3 is an illustration of a spatial measurements table included in the estimation device of FIG. 1A, according to various embodiments of the present disclosure.

DETAILED DESCRIPTION

GPS-Based Measurement of Object Heights

Figure 1A:
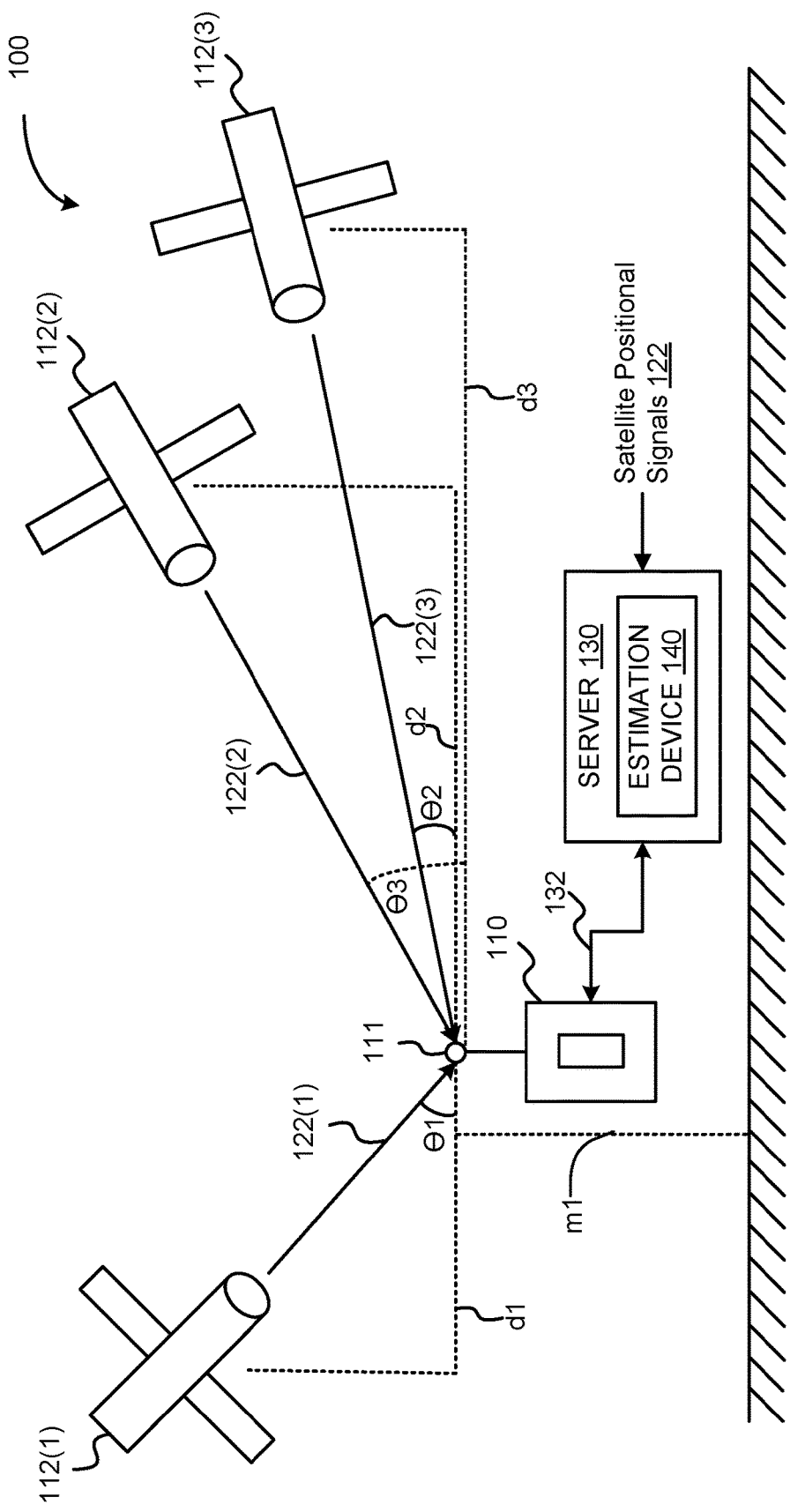
FIG. 1A is an illustration of a satellite spatial information system configured to implement one or more aspects of the present disclosure.

As described above, one problem with conventional approaches for using images to determine spatial data for objects is that the images may not provide enough information for a system to generate accurate spatial information. For example, a system may include one or more devices that generate images from sensor data collected from a given location, such as an imaging device generating radar images from information associated with collected electromagnetic signals. However, when a device attempts to infer the shape of an object from the radar image, the device may not be able to generate accurate dimensions for objects included in the radar image due to the low resolution of the radar image.

Other systems may attempt other techniques to determine spatial information for objects based on other data associated with electromagnetic signals being transmitted in the target area. A system may collect information associated with other radio signals, such as cellular and/or Wi-Fi communications signals. In such instances, the device may analyze information associated with multiple radio signals that were transmitted to a target area. A device could, for example, compare the relative signal strengths of radio signals received by one or more wireless receivers within the target area in order to determine positional information and, based on the positional information, may determine dimensions of a nearby object. However, such radio signals may be unreliable. A device analyzing such radio signals may, as a result, generate imprecise dimensions for objects in the environment.

Accordingly, in various embodiments disclosed herein, a satellite spatial information system includes an estimation device that, based on information associated with a plurality of satellite positional signals collected at a target location, provides estimated dimensions for one or more objects located at the target location. The estimation device receives messages associated with satellites transmitting satellite positional signals to a target location, and from mobile devices included in a given location receiving some of the transmitted positional signals. The estimation device determines, based on the spatial positions of the mobile device and the satellites, one or more rays formed by a satellite transmitting a satellite positional signal to the target area. The estimation device, based on the characteristics of a given satellite positional signal, estimates a plane of an object at the target location. For example, the estimation device computes an approximate height for an object that is positioned at the approximate height to intersect the ray associated with the satellite positional signal.

The estimation device aggregates a plurality of approximate heights for the object, where the estimation device generates each approximate object height by analyzing spatial information associated with separate satellite positional signals. The estimation device then generates, from the aggregated set of approximate heights, multiple costs associated with differences between the aggregated set of approximate heights and the spatial information of the plurality of satellite positional signals. The estimation device then analyzes the multiple costs in order to select, from the aggregated set of approximate heights, a single approximated height as the estimated object height for the object. These techniques are described below in further detail in conjunction with FIGS. 1-6.

FIG. 1A is an illustration of a satellite spatial information system 100 configured to implement one or more aspects of the present disclosure. As shown, satellite spatial information system 100 includes satellites 112, mobile device 110, and server 130. Mobile device 110 includes sensor 111. Server 130 includes estimation device 140.

For explanatory purposes, multiple instances of like objects are denoted with reference numbers identifying the object and additional numbers identifying the instance where needed. Further, satellite spatial information system 100 includes multiple instances of devices, even when not shown. For example, satellite spatial information system 100 could include multiple mobile devices 110 (e.g., 110(1), 110(2), etc.), sensors 111 (e.g., 111(1), 111(2), etc.), satellites 112 (e.g., 112(1), 112(2), etc.), and/or servers 130 (e.g., 130(1), 130(2), etc.), and still be within the scope of the disclosed embodiments.

Mobile device 110 is a device that may be transported and operated by a user. In various embodiments, mobile device 110 includes one or more sensors 111, one or more processors, and a memory subsystem. Examples of mobile device 110 may include, without limitation, a smartphone, a tablet computer, a handheld computer, a wearable device, a portable media player, a virtual reality (VR) console, an augmented reality (AR) console, a laptop computer, and so forth.

Sensor 111 includes one or more devices that are used by mobile device 110 and/or estimation device 140 to detect positions of object 160 in an environment. In various embodiments, mobile device 110 may use sensor 111 to perform geo-spatial measurements and/or collect data. In some embodiments, one or more sensors 111 may be coupled to and/or included within mobile device 110. In some embodiments, mobile device 110 may receive sensor data via the sensors 111, where the sensor data reflects the position of one or more objects within an environment. The position of the one or more objects may be derived from the absolute position of sensor 111, and/or may be derived from a position of an object relative to sensor 111.

In various embodiments, sensor 111 may be a receiver, such as a GPS receiver, antenna, antenna array, and so forth. In some embodiments, sensor 111 may also include other sensors to determine the position of mobile device 110. Such sensors could include, for example, optical sensors, such RGB cameras, time-of-flight sensors, infrared (IR) cameras, depth cameras, and/or a quick response (QR) code tracking system. Further examples include position sensors, such as an accelerometer, gyroscopic sensor, and/or magnetometer, audio sensors, wireless sensors, including radio frequency (RF) sensors (e.g., radar), ultrasound-based sensors (e.g., sonar), capacitive sensors, laser-based sensors, and/or wireless communications protocols, including Bluetooth, Bluetooth low energy (BLE), wireless local area network (Wi-Fi), cellular protocols, and/or near-field communications (NFC).

Satellite(s) 112 include one or more satellites that provide geo-spatial positioning information. In various embodiments, a given satellite (e.g., satellite 112(1)) may include one or more transmitters that broadcast one or more satellite positional signals in the form of radio waves to a reception area. In such instances, one or more sensors 111 within the reception area may successfully receive the satellite positional signal. Mobile device 110 and/or estimation device 140 may process information associated with sensor 111 receiving one or more satellite positional signals in order to determine the position (e.g., latitude, longitude, and/or elevation) of mobile device 110 and/or other objects that are within a specific location.

In various embodiments, satellites 112 may be components of a satellite position and/or navigation system, such as a global navigation satellite system (GNSS). In a satellite position system, multiple satellites may cover a specific location at any given time. In such instances, each satellite 112 broadcasts separate satellite positional signals. In some embodiments, the satellite positional signals include satellite information that specifies the location, status, and timing information of one or more satellites 112.

For example, satellite 112(1) could be a GPS satellite that transmits a GPS signal that includes a pseudo-random number (PSN) that identifies satellite 112(1) as transmitting the GPS signal, almanac data that describes the orbital courses for all GPS satellites (e.g., satellites 112(1), 112(2), 112(3), etc.) in satellite spatial information system 100, and ephemeris data that specifies where satellite 112(1) will be located at any time throughout the day. In some embodiments, satellite 112(1) may send GPS signals with updated ephemeris data that provides updates about the course of satellite 112(1). In some embodiments, a separate ground-based device, such as one or more receivers (not shown), may collect the ephemeris data and may transmit the ephemeris data to server 130 and/or mobile device 110. In various embodiments, mobile device 110 may calculate the distance between mobile device 110 and satellite 112(1) based on the PSN, almanac data, and/or ephemeris data.

Expected satellite positional signals 122 are one or more satellite positional signals that one or more satellites 112 are expected to transmit in the future. In various embodiments, satellite 112(1) may transmit a signal that specifies the timing of one or more expected satellite positional signals 122(1) that satellite 112(1) is to transmit, as well as the position (e.g., latitude, longitude, and elevation angle θ1) that satellite 112(1) will be located when transmitting expected positional signal 122(1). In such instances, mobile device 110 may expect to receive expected positional signal 122(1).

In various embodiments, mobile device 110 may, based on the timing and position information associated with one or more expected positional signals 122, determine the position of mobile device 110. For example, mobile device 110 may receive satellite information specifying that satellites 112(1)-112(3) will transmit expected satellite positional signals 122(1)-122(3) to a specific target location at a specific location and at a given time. In such instances, mobile device 110 may use the satellite information in order to determine the respective distances (d1, d2, d3) and elevation angles (θ1, θ2, θ3) of the respective satellites 112 relative to sensor 111. Mobile device 110 may then determine the x-y position (e.g., latitude and longitude) of mobile device 110 based on a combination of the expected satellite positional signals 122. In some embodiments, mobile device 110 may also use the satellite information to determine the height (m1) of mobile device 110 relative to satellites 112.

Mobile device message 132 is a message sent by mobile device 110 that includes mobile device data. In various embodiments, the mobile device data may include geo-spatial information, such as the determined position of mobile device 110. In some embodiments, the mobile device data includes the satellite information that mobile device 110 received from satellite 112. In some embodiments, the mobile device data may include information about mobile device 110, such as the device type of mobile device 110. In some embodiments, estimation device 140 may determine a device-type-specific baseline when making geo-spatial computations. For example, different mobile device types may receive the same satellite positional signal at differing signal strengths. In such instances, estimation device 140 may determine a baseline value that normalizes the signal strength based on the type of mobile device that received the satellite positional signal.

Server 130 includes estimation device 140 and a memory that stores information associated with features of a location ("location data") and/or relationships between one or more objects and/or features included in a given location ("geo-spatial data"). In various embodiments, estimation device 140 may determine the dimensions of one or more objects based on the location data and the geo-spatial data.

Estimation device 140 acquires satellite information associated with a set of expected satellite positional signals 122 that are to be transmitted to a specific target location. In some embodiments, estimation device 140 may receive the satellite information in one or more mobile device messages 132 from mobile device 110. In other embodiments, estimation device 140 may receive the satellite information in one or more satellite positional signals 122 that are received from a separate source, such as a ground-based receiver (not shown). In various embodiments, the satellite information may include satellite-specific information, such as current almanac data and/or current ephemeris data, which includes state information and other information about each GPS satellite that is active. The satellite information may also include geo-spatial data for a given location.

In various embodiments, estimation device 140 may use the location data in order to identify a specific target location. For example, the location data may specify a specific range of latitudes and longitudes. In such instances, estimation device 140 may, based on a specific target location, filter the satellite information in order to identify one or more satellites 112 that are to transmit expected satellite positional signals 122 to the specific target location. In some embodiments, estimation device 140 may use the satellite information in order to identify a set of expected satellite positional signals 122 (e.g., satellite positional signals 122(1), 122(2), 122(3)) that are to be transmitted by at least one satellite 112 and are expected to be received by one or more sensors 111 at the specific target location.

Figure 1B:
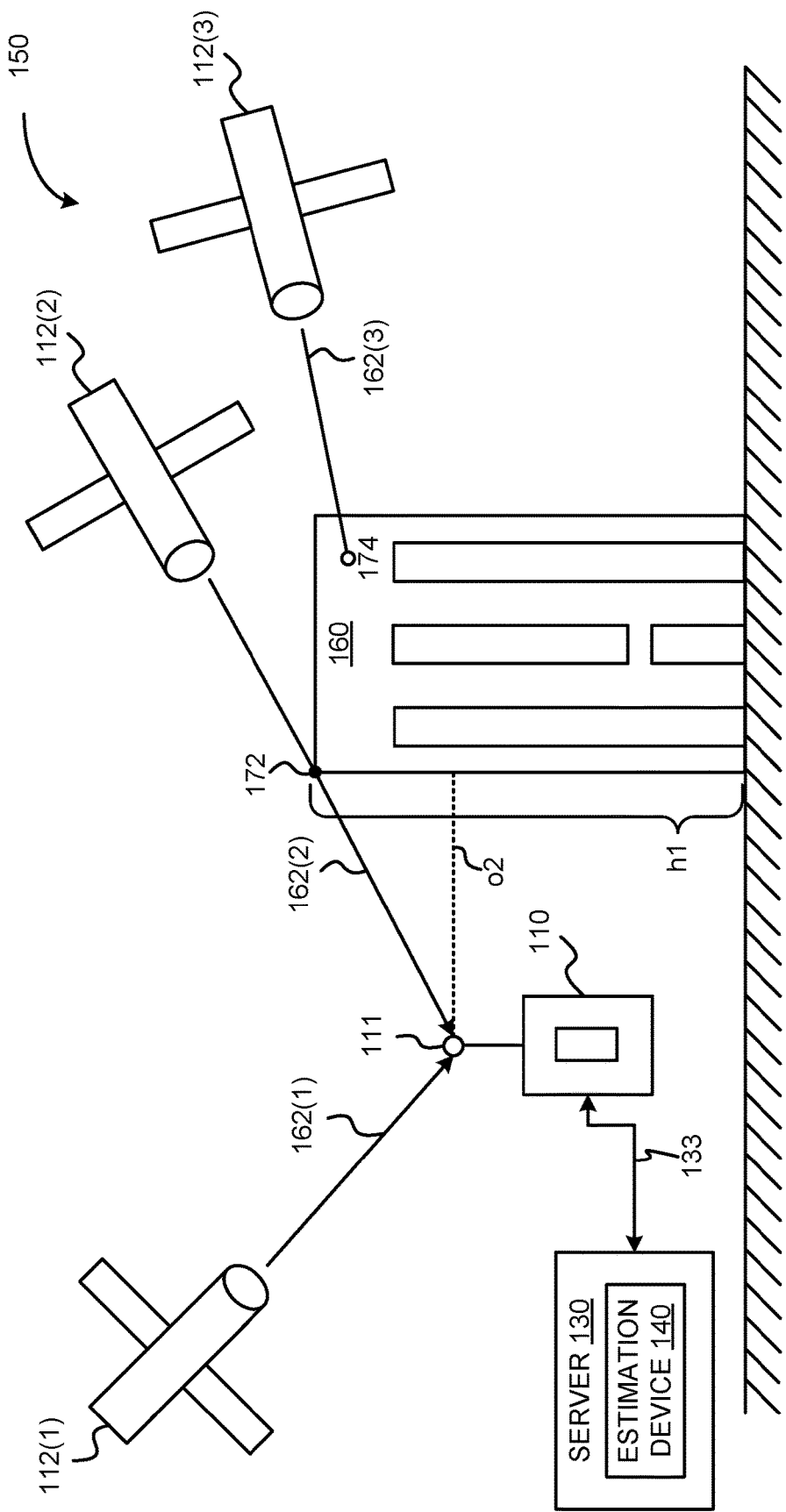
FIG. 1B is an illustration of a sensor receiving satellite positional signals within the satellite spatial information system of FIG. 1A, according to various embodiments of the present disclosure.

FIG. 1B is an illustration of sensor 111 receiving observed satellite positional signals 162 within satellite spatial information system 100 of FIG. 1A, according to various embodiments of the present disclosure. As shown, satellite spatial information system 150 includes satellites 112, mobile device 110, server 130, and object 160.

In operation, a set of satellites send a set of satellite positional signals that correspond to expected satellite positional signals 122. Mobile device 110 receives sensor data in the form of one or more observed satellite positional signals 162. Mobile device 110 generates and transmits updated mobile device message 133 to server 130. In various embodiments, updated message 133 may include mobile device data that includes information about the one or more observed satellite positional signals 162 that were received by sensor 111.

Observed satellite positional signals 162 include one or more satellite positional signals that are transmitted by satellites 112. Each observed satellite positional signal 162 corresponds to an expected satellite positional signal 122. For example, each satellite 112 could periodically send signals to an area that sensor 111, barring error or other interference, is expected to receive at the specific target location (e.g., expected satellite positional signal 122). When satellite 112 generates the signal, sensor 111 could subsequently receive the signal as observed satellite positional signal 162. In various embodiments, one or more characteristics of observed satellite positional signal 162 may be specified in satellite information provided by satellite 112 before transmission. In such instances, mobile device 110 and/or estimation device 140 may compare the characteristics of observed satellite positional signal 162 that were actually measured by sensor 111 against the characteristics specified in the previously-received satellite information and, based on any differences in characteristics, determine the positions of mobile device 110 and one or more objects 160 at the specific target location.

In some embodiments, mobile device 110 and/or estimation device 140 may analyze characteristics of observed satellite positional signal 162 in order to identify the ray that forms when the observed satellite positional signal 162 travels in a direct straight-line path from satellite 112 to sensor 111. For example, estimation device 140 could identify the specific positions of mobile device 110 and satellite 112(1). Estimation device 140 could then, based on the elevation angle and timing information (e.g., a time difference between the transmission and reception of observed satellite positional signal 162(1)) to determine the path of the ray formed by observed satellite positional signal 162(1).

One or more observed satellite positional signals 162 are received in a straight line of sight by sensor 111. When sensor 111 receives an observed satellite positional signal 162 in a straight line of sight, a ray forms between the position of sensor 111 and the transmitter included in satellite 112. Mobile device 110 and/or estimation device 140 then computes other geo-spatial information based on the ray formed by observed satellite positional signal 162.

Mobile device 110 stores observed satellite positional signal 162 and corresponding information, such as the time that observed satellite positional signal 162 was received, the signal strength, etc. Mobile device 110 logs data associated with observed satellite positional signal 162. In various embodiments, mobile device 110 may send to server 130 an updated mobile device message 133 that includes the information associated with observed satellite positional signal 162. In some embodiments, multiple mobile devices 110 may send separate mobile device messages 132 to server 130. In such instances, estimation device 140 may aggregate information about observed satellite positional signals 162 and/or values computed from observed satellite positional signals 162 in order to provide one or more estimated dimensions for object 160.

In some embodiments, updated mobile device message 133 may include one or more National Marine Electronics Association (NMEA) format messages that specify satellite information and/or information associated with observed satellite positional signal 162. For example, mobile device 110 could receive information associated with observed satellite positional signal 162, reported by an included GPS chipset every second. Mobile device 110 could in turn generate an updated mobile device message 133 that includes the reported signal information, such as the signal strength (e.g., carrier-to-noise ratio) as received by sensor 111.

In some embodiments, updated mobile device message 133 may include an updated estimate of the location of mobile device 110. For example, mobile device 110, upon receiving the one or more observed satellite positional signals 162, could perform one or more GPS calculations to determine its position relative to satellites 112(1), 112(2). Mobile device 110 could then include the updated position estimate in updated mobile device message 133. In some embodiments, updated mobile device message 133 may include an uncertainty value that corresponds to the degree of error involved in the estimated position of mobile device 110. In such instances, estimation device 140 may use the uncertainty value when computing the position and/or dimensions of object 160.

Object(s) 160 include one or more objects positioned in a given location where sensor 111 receives observed satellite positional signals 162. In various embodiments, object 160 may partially block or fully block one or more observed satellite positional signals 162 before such signals are received by sensor 111. In such instances, estimation device 140 may determine characteristics of object 160, such as the position of object 160 and/or the dimensions of object 160 based on the blockages caused by object 160.

For example, an edge of object 160 causes a partial blockage 172 of observed satellite positional signal 162(2) as the signal forms a ray between satellite 112(2) and sensor 111. Sensor 111 could receive observed satellite positional signal 162(2) with an attenuated signal strength due to partial blockage 172. Estimation device 140 could, based on the attenuated signal strength, determine that the edge of object 160 caused partial blockage 172. Estimation device 140 could then, using information associated the positions of sensor 111, object 160 (e.g., positioned a distance of o2 away from sensor 111 in the plane of the ray formed by observed satellite positional signal 162(2)), and satellite 112(2) (e.g., latitude, longitude, azimuth angle, and/or elevation angle), determine the height (h1) of the edge of object 160.

In another example, object 160 causes a full blockage 174 of observed satellite positional signal 162(3) such that sensor 111 does not receive observed satellite positional signal 162(3). Mobile device 110 and/or estimation device 140 could compare the set of observed satellite positional signals 162 (e.g., observed satellite positional signals 162(1) and 162(2)) and the set of expected satellite positional signals 122 (e.g., expected satellite positional signals 122(1), 122(2), 122(3)), in order to determine that observed satellite positional signal 162(3) is missing from the group of received observed satellite positional signals 162. In some embodiments, estimation device 140 may generate a missing observed satellite positional signal 162(3), which has default characteristics, such as a zero or negligible signal strength.

In various embodiments, estimation device 140 may aggregate information associated with a plurality of rays formed from a set of expected satellite positional signals 122 and/or observed satellite positional signals 162. In such instances, estimation device 140 may estimate the dimensions of object 160 based on a plurality of expected satellite positional signals 122 and/or observed satellite positional signals 162. For example, estimation device 140 could compute different approximate heights for object 160, including a first approximate height computed from observed satellite positional signal 162(2), and a second approximate height computed from missing observed satellite positional signal 162(3). In such instances, estimation device 140 could aggregate the separately computed approximate object heights and determine a single estimated object height based on the aggregated set of approximate object heights.

Figure 2:
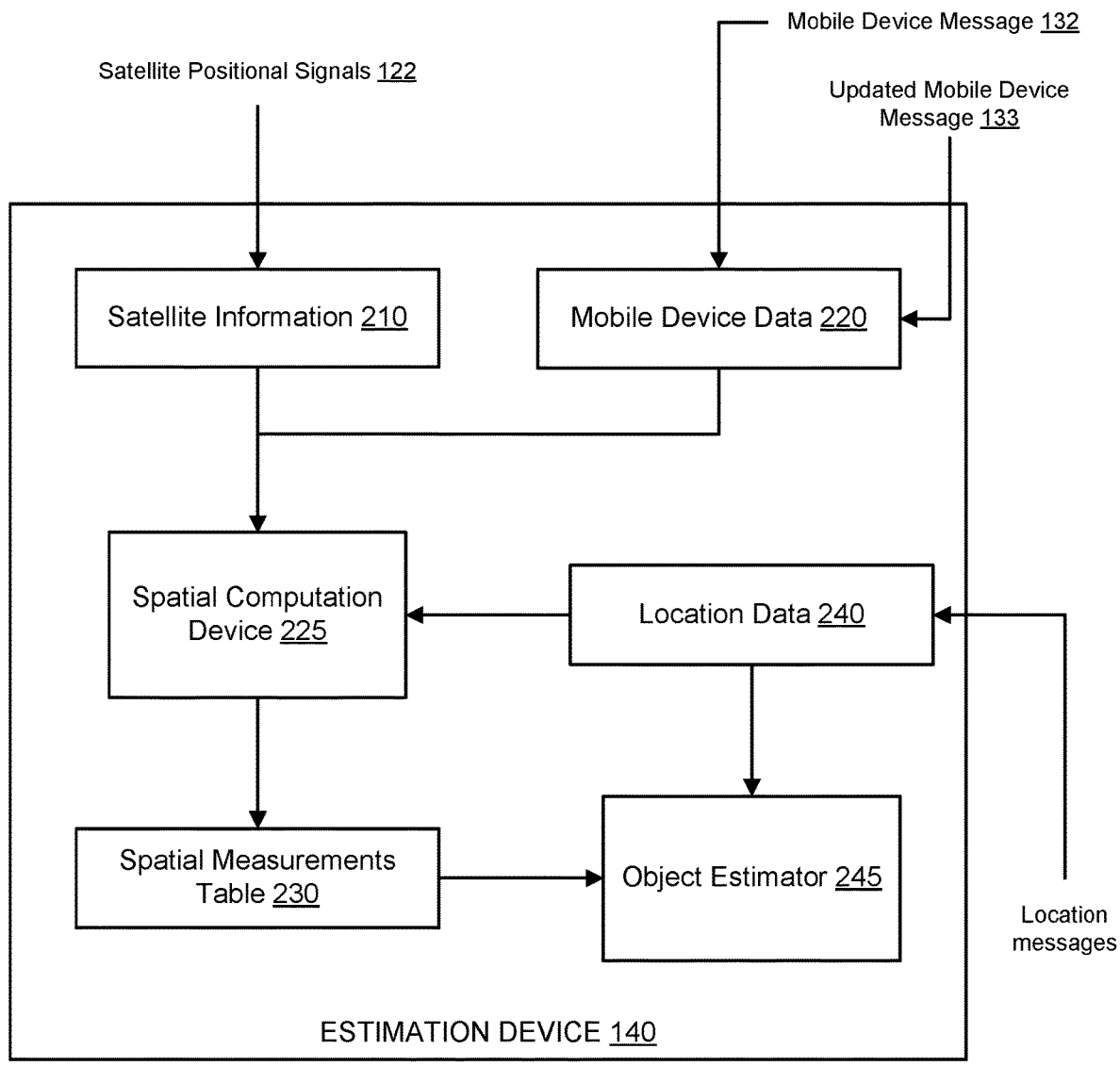
FIG. 2 is an illustration of the estimation device included in the satellite spatial information system of FIG. 1A, according to various embodiments of the present disclosure.

FIG. 2 is an illustration of estimation device 140 included in satellite spatial information system 100 of FIG. 1A, according to various embodiments of the present disclosure. As shown, estimation device 140 includes spatial computation device 225 and object estimator 245. Estimation device stores satellite information 210, mobile device data 220, spatial measurements table 230, and location data 240.

In operation, estimation device 140 receives information from one or more sources and stores the information as satellite information 210, mobile device data 220, and location data 240. Spatial computation device 225 generates entries in spatial measurements table 230. A given entry includes information about a ray formed by a given observed satellite positional signal 162, as well as one or more geo-spatial values associated with the ray and one or more objects positioned at the specific target location. Object estimator 245 aggregates information included in spatial measurements table 230 and generates an estimation for at least one dimension of a given object 160 based on the aggregated set of values extracted from spatial measurements table.

Satellite information 210 includes satellite-specific information, such as current almanac data and/or current ephemeris data, which includes state information and other information about each satellite 112 that is active. Satellite information 210 may also include geo-spatial data for a given location. In various embodiments, satellite information 210 may include information about a specific satellite, such as an identifier for a given satellite 112(2). Satellite information 210 also includes almanac data that describes the orbital courses for all active satellites 112 in satellite spatial information system 100. Satellite information 210 further includes ephemeris data that specifies where a given satellite 112(2) will be located at a given time.

Mobile device data 220 includes information about mobile device 110, as well as geo-spatial information, such as the determined position of mobile device 110. In some embodiments, mobile device data 220 includes information about mobile device 110, such as the device type of mobile device 110.

In some embodiments, spatial computation device 225 may determine a device-type-specific baseline when making geo-spatial computations. For example, different mobile device types may receive the same observed satellite positional signal 162(2) at differing signal strengths. In such instances, estimation device 140 may determine baseline values for separate mobile devices 110 that normalize the signal strengths based on the type of mobile devices 110 that received the observed satellite positional signal 162(2).

Spatial computation device 225 computes one or more geo-spatial values associated with mobile device 110 and/or object 160. In various embodiments, spatial computation device 225 may iteratively compute the position of mobile device 110 and/or dimensions for object 160. For example, spatial computation device 225 could use timing information included in satellite information 210 and mobile device data 220 in order to determine the path of a ray formed by observed satellite positional signal 162(2). Spatial computation device 225 could then compute spatial data associated with mobile device 110 and/or satellite 112(2) (e.g., a direct-line path, a direct-line distance, a ground distance, an elevation angle, an azimuth angle, etc.). Spatial computation device 225 could further, based on position information for object 160 that is included in satellite information 210, mobile device data 220, and/or location data 240, compute an approximate height for object 160.

In various embodiments, spatial computation device 225 may group information associated with a given ray and computations that are based on a given ray and store the information as entries in spatial computation device 225. In various embodiments, spatial computation device 225 may store separate entries for multiple observed satellite positional signals 162 (including both successfully-received signals and missing signals), as well as approximate heights for object 160 that were computed based on the ray formed by observed satellite positional signals 162. In various embodiments, spatial measurements table 230 may store entries associated with sensors 111 receiving observed satellite positional signals 162 over a specified period of time. For example, spatial computation device 225 may store in spatial measurements table 230 entries associated with observed satellite positional signals 162 that were transmitted by satellites 112 over a one-month period. In such instances, object estimator 245 may filter entries stored in spatial measurements table 230 in order to analyze a subset of observed satellite positional signals 162 that are associated with a specific location and/or a specific direction (e.g., rays where object 160 would be positioned between a given mobile device 110 and a satellite 112).

Location data 240 includes information associated with features of one or more locations. In various embodiments, estimation device 140 may receive location data from one or more data servers, such as map data for areas associated with specific locations. In some embodiments, location data 240 may include information about specific features, such as the x-y footprint (e.g., the ground-level area) that a given object 160 occupies at a specific location. In such instances, estimation device 140 may extract position information associated with an object 160 from location data 240 when generating approximate dimensions, such as an object height, for the object 160.

Object estimator 245 retrieves a set of entries stored in spatial measurements table 230 in order to determine an estimated object height for object 160. For example, object estimator 245 may extract a set of entries associated with rays formed between mobile device 110 and one or more satellites 112. Object estimator 245 could filter the set of entries to only include rays that have a path where object 160 is positioned between mobile device 110 and a given satellite 112, for example, filtering out an entry associated with observed satellite positional signal 162(1). In various embodiments, object estimator 245 may generate an estimated object height based on an aggregated set of separate approximate heights. In such instances, object estimator 245 may determine a single estimated object height based on one or more criteria (e.g., minimizing the cost associated with attenuated signal strengths of one or more observed satellite positional signals 162).

FIG. 3 is an illustration of spatial measurements table 300 included in estimation device 140 of FIG. 1A, according to various embodiments of the present disclosure. As shown, spatial measurements table 300 includes signal group 310, expected signal strength 312, observed signal strength 314, attenuation value 316, observed time 318, observed angles 320, approximate object height 322, and table entries 331-341.

In operation, spatial computation device 225 computes, for a given signal group 310, an attenuation value 316. Spatial computation device 225 also computes the path of the ray formed by observed satellite positional signal 162. In various embodiments, spatial computation device 225 may, based on the path of the ray and the attenuation value 316, generate an approximate object height 322 for object 160.

Signal group 310 is a group of signals that includes a pair of an expected satellite positional signal 122 and a corresponding observed satellite positional signal 162. For example, entry 331 for signal group 1 could include expected satellite positional signal 122(1) and observed satellite positional signal 162(1). In various embodiments, spatial computation device 225 pairs a given observed satellite positional signal 162 to a corresponding expected satellite positional signal 122. For example, spatial computation device 225 may compare signal information included in mobile device data 220 with signal information included in satellite information 210 in order to find an expected satellite positional signal 122 that is applicable to the specific target location.

In various embodiments, spatial computation device 225 may determine that the observed satellite positional signal 162 in a given signal group 310 has different characteristics than the expected satellite positional signal 122 in the signal group 310. In such instances, spatial computation device 225 may compute an attenuation value 316, which may be associated with sensor 111 receiving a partially-blocked observed satellite positional signal 162 at the specific target location.

In some embodiments, spatial computation device 225 may analyze mobile device data 220 in order to adjust attenuation value 316. For example, estimation device 140 may determine the device type of mobile device 110 and may apply one or more compensation values based on the determined device type. In some embodiments, spatial computation device 225 may compute one or more weight values based on an uncertainty value that corresponds to the degree of error involved in the estimated position of mobile device 110. In such instances, spatial computation device 225 applies one or more weights when determining the path for the ray formed by observed satellite positional signal 162 and/or approximate object height 322.

In some embodiments, spatial computation device 225 may group entries 331-341 based on the attenuation value 316. For example, spatial computation device 225 may separate attenuation values into separate ranges (e.g., below 10 dB, between 10-20 dB, and above 20 dB). In such instances, object estimator 245 may aggregate approximate object heights 322 for entries within a given range when determining an estimated object height.

In some embodiments, spatial computation device 225 may determine that a given expected satellite positional signal 122(3) does not have a corresponding observed satellite positional signal 162(3). For example, spatial computation device 225 could analyze timing information included in satellite information 210 and/or mobile device data 220 to determine that sensor 111 did not receive observed satellite positional signal 162(3). In such instances, spatial computation device 225 may determine that sensor 111 missed receiving observed satellite positional signal 162(3) and may assign a default missing signal to the signal group 310. For example, entries 337, 339 include signal groups 310 that have missing an observed positional signal. Spatial computation device 225 includes a default missing observed positional signal that has a 0 or negligible signal strength.

Spatial computation device 225 computes an approximate object height 322 for given signal group 310. For example, spatial computation device 225 could first determine the path of a ray formed by observed satellite positional signal 162. Spatial computation device 225 could then, based on the relative position of object 160 to mobile device 110, compute an approximate object height 322, where an edge of object 160 at approximate object height 322 intersects the ray. For example, when spatial computation device 225 determines that object 160 is positioned 5 meters away from sensor 111 ("object distance"), spatial computation device 225 may apply trigonometric properties of the elevation angle to the object distance in order to generate an approximate object height 322. In some embodiments, spatial computation device 225 may adjust the approximate object height 322 based on the elevation of sensor 111 to the ground.

In some embodiments, spatial computation device 225 may adjust the approximate object height 322 based on the attenuation value. For example, spatial computation device 225 could determine that an edge of object 160 causes a predicted attenuation value (e.g., 20 dB). In such instances, spatial computation device 225 could lower the approximate object height 322 for attenuation values below the predicted attenuation value, while raising the approximate object heights for attenuation values above the predicted attenuation value.

Figure 4:
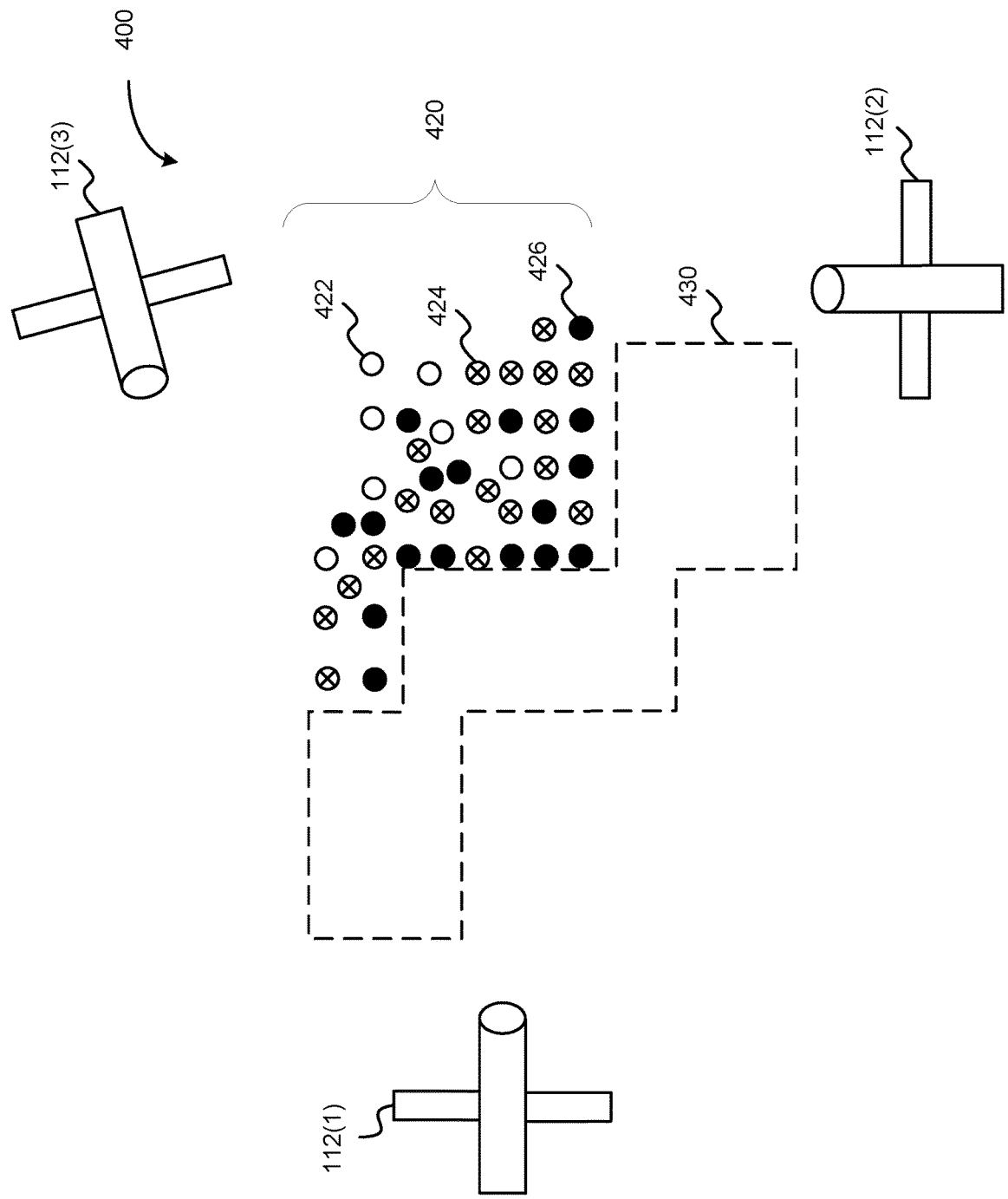
FIG. 4 is an illustration of an aggregate of satellite positional signals provided by components of the satellite spatial information system of FIG. 1A, according to various embodiments of the present disclosure.

FIG. 4 is an illustration of an aggregate of satellite positional signals provided by components of the satellite spatial information system of FIG. 1A, according to various embodiments of the present disclosure. As shown, target location 400 includes satellites 112, mobile device locations 420, and object footprint 430. Mobile device locations 420 include clear ray locations 422, attenuated ray locations 424, and blocked ray location 426.

In operation, estimation device 140 may filter entries included in spatial measurements table 230 based on the path of the ray formed by observed satellite positional signals 162. In various embodiments, estimation device 140 may filter entries by only aggregating entries associated with rays that have object footprint 430 positioned between a given mobile device location 420 and a satellite 112. For example, when determining an estimated height for an object that has object footprint 430, estimation device 140 may filter out rays that are formed from observed satellite positional signals 162 between mobile device locations 420 and satellite 112(3).

In some embodiments, spatial computation device 225 and/or object estimator 245 may analyze location data 240 in order to determine a one-dimensional or two-dimensional object footprint 430 is object 160 is positioned within target location 400. In such instances, spatial computation device 225 may compute a distance between mobile device location 420 and an edge of object footprint 430. Spatial computation device 225 may then compute an approximate object height 322 corresponding to the edge of object footprint 430 intersecting the ray.

In some embodiments, estimation device 140 may, after estimating an object height for object 160, aggregate more entries included in spatial measurements table 230. In such instances, estimation device 140 may aggregate more entries in order to generate a more precise estimated object height. For example, object estimator 245 could generate a first estimated object height based on a set of entries associated with rays formed from observed satellite positional signals 162(1) transmitted by satellite 112(1). After generating the first estimated object height, object estimator 245 could then generate object height based on an additional set of entries associated with rays formed from observed satellite positional signals 162(2) transmitted by satellite 112(2).

In some embodiments, estimation device 140 may not receive position information associated with object 160. In such instances, estimation device 140 may determine the position of object footprint 430 based on an aggregated set of entries associated with mobile device locations 420. For example, spatial computation device 225 could aggregate entries for rays within a specific range of azimuth angles (e.g., 0-) 90°. Spatial computation device 225 could then estimate the position of object 160 from the relative positions of clear ray locations 422, attenuated ray locations 424, and/or blocked ray locations 426.

In various embodiments, estimation device 140 may aggregate a group of entries, or a specific value included in the entries, that is included in spatial measurements table 230. For example, object estimator 245 could aggregate a group of approximate object heights 322 into an aggregated set of computed heights. In some embodiments, object estimator 245 may generate the aggregated set of approximate object heights 322 from observed satellite positional signals 162 that were received by a plurality of sensors 111 a specific time period. For example, object estimator 245 could aggregate a group of approximate object heights 322 from entries recorded during a 1-month period.

Figure 5:
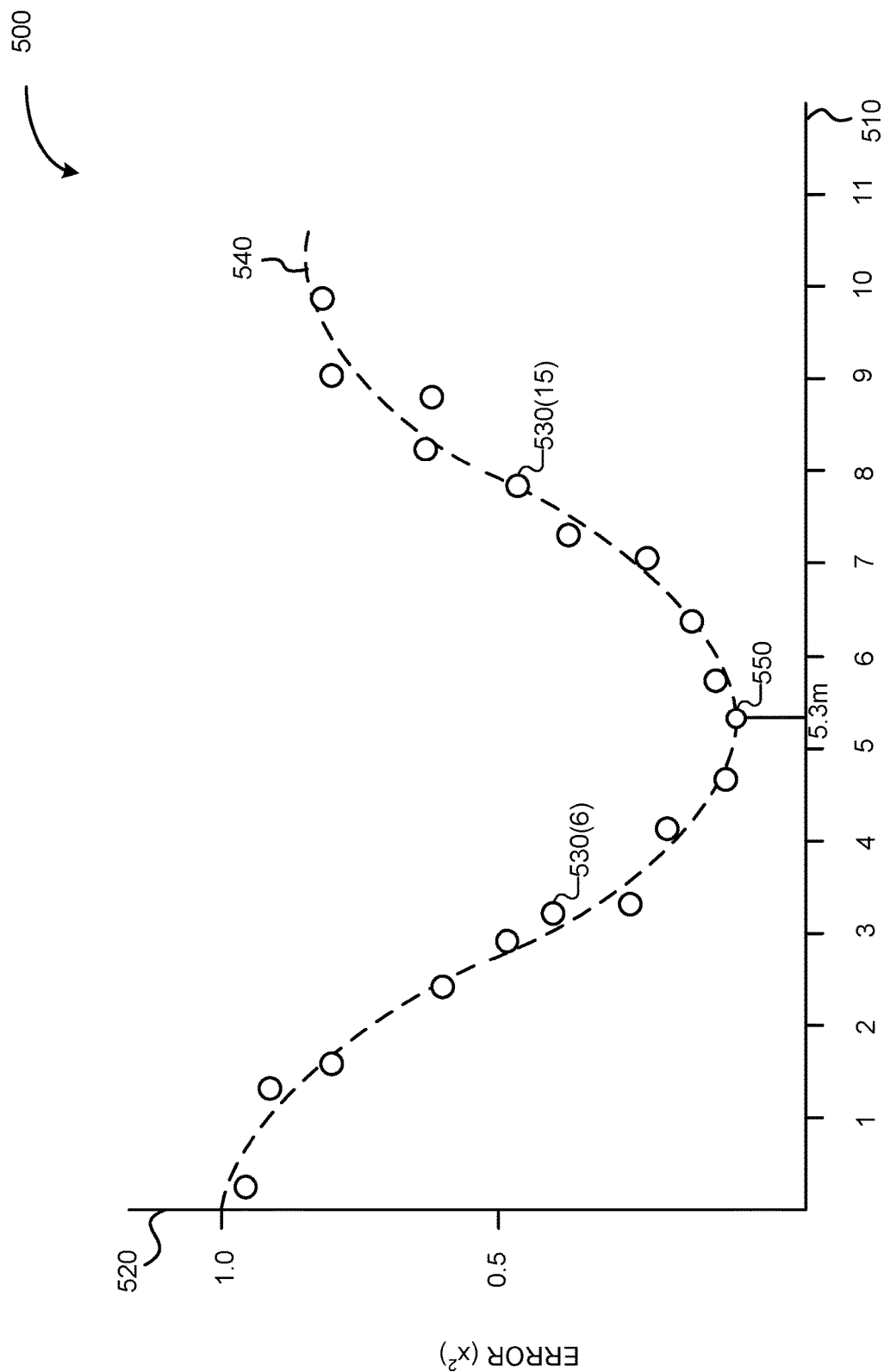
FIG. 5 is a chart illustrating various costs generated by an estimation device of FIG. 1A, according to various embodiments of the present disclosure.

FIG. 5 is a chart 500 illustrating a various costs 530 generated by estimation device 140 of FIG. 1A, according to various embodiments of the present disclosure. As shown, chart 500 includes a plurality of costs 530, cost function 540, and estimated object height 550.

Chart 500 shows a mean-squared cost (MSC) for approximate object height 322 based on the aggregated set of rays associated with an approximate object height. As shown, chart 500 has an x-axis corresponding to approximate object height 510 and a y-axis corresponding to the mean-squared cost 520. In some embodiments, object estimator 245 may compute different values in order to compute approximate object height 510. For example, object estimator 245 could generate a probability function that estimates the probability of an edge of the object at a given height, where the edge of the object changes an observed satellite positional signal 162 from being attenuated to being unattenuated.

When estimating the object heights by minimizing a cost function, object estimator 245 computes MSCs for a set of entries 331-341 associated with one or more approximate object heights 322. For example, object estimator 245 could assign a predicted attenuation value (e.g., 20 dB) that object 160 causes when the edge of object 160 intersects a ray formed by observed satellite positional signal 162. Object estimator 245 could compute a cost as a difference between the predicted attenuation value (20 dB) and the actual attenuation value 316 for a given ray. Object estimator 245 could then compute the MSC by combining all the separate costs for a specific approximate object height 322.

For example, object estimator 245 could compare attenuation value 316 for signal group 1, corresponding to entry 331, against a predicted attenuation value. In such an instance, object estimator could determine that when object 160 has an approximate object height 322 of 6.5 m, object 160 would intersect a ray formed by observed satellite positional signal 162 and generate a predicted attenuation value 316 of 20 dB. Object estimator 245 could compare the predicted attenuation value with attenuation value 316 of 0 dB for entry 331 (indicating that object 160 does not intersect the ray) and compute a squared cost value of 0.9.

In another example, object estimator 245 could determine, based on entry 333, that when object 160 has a height of 6.5 m, object 160 would not intersect a ray formed by observed satellite positional signal 162 resulting in a predicted attenuation value of 0 dB. Object estimator 245 could compare the predicted attenuation value of 0 dB with attenuation value 316 of 6 dB for entry 333 (indicating that object 160 likely does not intersect the ray) and assign a squared cost value of 0.036.

In various embodiments, object estimator 245 may compute a group of MSCs 530 for a range of different approximate object heights. In various embodiments, object estimator 245 may generate a specific MSC 530 for a given approximate object height 322 by combining all the MSCs associated with the given approximate object height 322. In some embodiments, object estimator 245 may determine separate MSCs 530 using differing quantities of entries 331-341. For example, object estimator 245 could analyze 20 separate entries that include approximate object height 322 of 5 m. In such instances, each of the 20 separate entries 331-341 could be included with differing attenuation values 316. In such instances, object estimator 245 could combine the separately computed squared costs in order to compute an MSC 530 for the approximate object height 322 of 5 m.

Estimation device 140, using one or more on cost MSCs 530, generates estimated object height 550 for object 160. In various embodiments, object estimator 245 may compare a set of MSCs 530 and/or determine specific costs in order to determine a single value 550 as an estimated object height for object 160. For example, object estimator 245 could determine a minimum value from a set of MSCs 530. Object estimator 245 could then select the object height corresponding to the minimum cost MSC as estimated object height 550. In such instances, estimated object height 550 represents the most-likely object height for object 160 that would cause the rays associated with the aggregated set of entries to have the characteristics as recorded.

In some embodiments, object estimator 245 may generate cost function 540 as a best-fit curve of the group of MSCs 530. For example, upon determining a group of MSCs 530 (e.g., 530(1)-530(19)) for a range of approximate object heights 322 between 1 m and 12 m, object estimator 245 could generate a best-fit curve as cost function 540. In such instances, object estimator 245 may analyze cost function 540 when determining estimated object height 550.

In various embodiments, object estimator 245 could alternatively generate a probability function that estimates the probability of an edge of the object at a given height, where the edge of the object changes an observed satellite positional signal 162 from being attenuated to being unattenuated. In such instances, object estimator 245 may aggregate the attenuation values 316 for entries 331-341 in order to determine an estimated height for the edge of object 160, where the edge of object 160 separates groups of attenuation values. In such instances, object 160 likely obstructs observed positional satellite signals 162(2), 162(3), and generates attenuation values above a threshold, while the edge of object 160 likely does not obstruct observed satellite positional signals 162(1) and generates attenuation value below the threshold.

In some embodiments, object estimator 245 may compute a ratio of attenuated signals to unattenuated signals and determine the estimated object height that generates the highest value for the ratio. Additionally or alternatively, object estimator 245 may compute a probability function that determines the probability that a given object height is the edge of object 160 ($P_{edge}$), where $P_{edge}$ is determined from the ratio of attenuated signals to unattenuated signals. In such instances, object estimator 245 may determine the height that generates the highest value for $P_{edge}$ and set the corresponding value as estimated object height 550.

Figure 6:
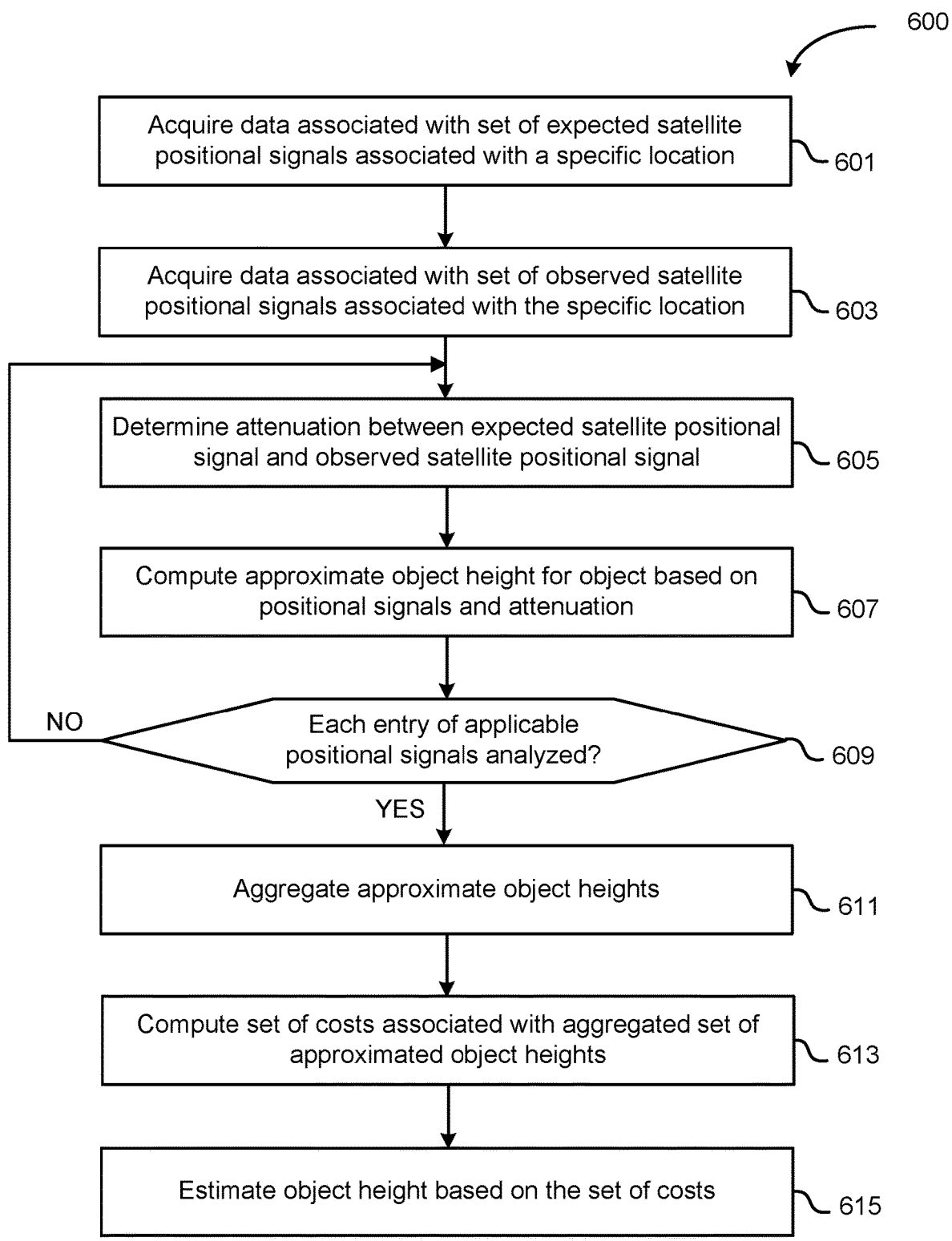
FIG. 6 sets forth a flow diagram of method steps for determining one or more spatial estimations, according to various embodiments of the disclosure.

FIG. 6 sets forth a flow diagram of method steps for estimating a height of an object using satellite communications signals, according to various embodiments of the disclosure. Although the method steps are described in conjunction with FIGS. 1-5, persons of ordinary skill in the art will understand that any system configured to perform this method and/or methods described herein, in any order, and in any combination not logically contradicted, is within the scope of the present invention.

As shown, method 600 begins at step 601, where estimation device 140 acquires data associated with a set of expected satellite positional signals 122 at a specific location. For example, satellite 112 may transmit a GPS signal that includes information about one or more expected satellite positional signals 122 that satellite 112 is to transmit in the future. In various embodiments, estimation device 140 may acquire and/or store geo-spatial information and/or device information associated with one or more satellites 112 transmitting satellite positional signals. For example, server 130, including estimation device 140, may receive GPS signals from satellite 112 and/or mobile device messages 132 from a plurality of mobile devices 110. In such instances, the GPS signal and/or mobile device messages 132 could contain satellite information that specifies the timing of one or more expected satellite positional signals 122(1) that satellite 112(1) is to transmit, as well as the position (e.g., latitude, longitude, and elevation angle θ1) that satellite 112(1) will be located when transmitting expected positional signal 122(1).

At step 603, estimation device 140 acquires data associated with a set of observed satellite positional signals associated with the specific location. In various embodiments, satellites 112 transmit to the specific target location one or more observed satellite positional signals 162. In such instances, one or sensors 111 positioned within the specific target location may receive the observed satellite positional signals 162. Sensor 111 receives a given observed satellite positional signal 162 in a direct, line-of-sight path from a transmitter included in satellite 112. In such instances, mobile device 110 may log data associated with the received observed satellite positional signal 162. In some embodiments, mobile device 110 and/or estimation device 140 may analyze characteristics of observed satellite positional signal 162 in order to determine the position of mobile device 110.

At step 605, estimation device 140 determines an attenuation between expected satellite positional signal 122 and observed satellite positional signal 162. Each satellite positional signal has an associated signal strength. In various embodiments, estimation device 140 may determine, for a given observed satellite positional signal 162, a corresponding expected satellite positional signal 122 and an attenuation value based on the differences in the respective signal strengths. Estimation device 140 may then store, in a spatial measurement table, an entry that includes the attenuation value for the pair of observed satellite positional signal 162 and expected satellite positional signal.

In some instances, estimation device 140 determines that sensor 111 received observed satellite positional signal 162 that had the same signal strength as the signal strength of a corresponding expected satellite positional signal 122, indicating that no object caused a blockage of the ray formed by observed satellite positional signal 162. In some instances, estimation device 140 determines that sensor 111 received observed satellite positional signal 162 having a lower signal strength than the signal strength of a corresponding expected satellite positional signal 122, indicating that object 160 is positioned such that object 160 causes a partial blockage of the ray and an attenuated signal strength for observed satellite positional signal 162. In other instances, sensor 111 does not receive observed satellite positional signal 162 and estimation device 140 may determine that object 160 causes a total blockage of the ray such that sensor 111 did not receive observed satellite positional signal 162.

In some embodiments, estimation device 140 may determine, based on the respective timing information included in the satellite information and mobile device data, that observed satellite positional signal 162 has a corresponding expected satellite positional signal 122. In such instances, spatial computation device 225 could compute the attenuation value as the difference between associated signal strengths of observed satellite positional signal 162 and expected satellite positional signal 122. In some embodiments, estimation device 140 may determine, based on the satellite information, that sensor 111 did not receive an observed satellite positional signal 162. In such instances, estimation device 140 may determine that sensor 111 missed receiving observed satellite positional signal 162. For example, estimation device 140 could determine from the timing information that satellite 112(3) transmitted observed satellite positional signal 162(3) that sensor 111 did not successfully receive. Estimation device 140 could respond by assigning a missing observed satellite positional signal 162 that has a zero or negligible signal strength.

At step 607, estimation device 140 computes an approximate object height for object 160. Estimation device 140 generates, from the observed satellite positional signal 162 and/or expected satellite positional signal 122, dimensions for object 160 that would cause object 160 to intersect with the path of the ray formed by observed satellite positional signal 162.

In various embodiments, spatial computation device 225 may analyze and determine the positions (e.g., latitude, longitude, and/or altitude) of sensor 111, satellite 112, and object 160. Spatial computation device 225 may then apply one or more trigonometric functions to determine an approximate object height that would cause the edge of object 160 to intersect the ray formed by observed satellite positional signal 162. In some embodiments, spatial computation device 225 may adjust the approximate object height based on the computed attenuation value. For example, spatial computation device 225 could determine that an edge of object 160 causes a predicted attenuation value (e.g., 20 dB). In such instances, spatial computation device 225 could lower the approximate object height 322 for attenuation values below the predicted attenuation value, while raising the approximate object heights for attenuation values above the predicted attenuation value.

At step 609, estimation device 140 determines whether spatial computation device 225 analyzed each entry of applicable positional signals. In various embodiments, spatial computation device 225 may iteratively compute, for each of a set of entries included in a spatial measurements table, a separate approximate object value. For example, spatial computation device 225 may initially select, from the spatial measurements table, a set of entries for rays that are within a specific area, or rays that have specific elevation angles and/or azimuth angles. In such instances, estimation device 140 may determine whether spatial computation device 225 analyzed each entry included in the set of entries. When estimation device 140 determines that an entry remains to be analyzed, estimation device 140 returns to step 605 in order for spatial computation device 225 to determine an attenuation value from the observed satellite positional signal 162 and/or expected satellite positional signal 122. Otherwise, when estimation device 140 determines each expected satellite positional signal has been analyzed, estimation device 140 proceeds to step 611.

At step 611, estimation device 140 aggregates the approximate object heights associated with object 160 into an aggregated set of approximate object heights. In some embodiments, the aggregated set of object heights may include approximate object heights that estimation device 140 produced over a specific time period. For example, object estimator 245 could aggregate a group of approximate object heights that object estimator 245 generated for the specific target location over a two-week period. In some embodiments, object estimator 245 may aggregate groups of approximate object heights based on the signal strength of observed satellite positional signal 162. For example, object estimator 245 could generate an aggregated set of approximate object heights, where each approximate height is associated with a missing observed satellite positional signal.

At step 613, estimation device 140 computes a set of costs 530 associated with the aggregated set of approximate object heights. In various embodiments, object estimator 245 may generate a cost value that is based on a difference between a predicted attenuation value that object 160 provides at a specific height, and the actual attenuation value that was computed. For example, object estimator 245 could assign a predicted attenuation value (e.g., 20 dB) that object 160 causes when the edge of object 160 intersects a ray formed by observed satellite positional signal 162. Object estimator 245 could compute a cost value as a difference between the predicted attenuation value (20 dB) and the actual attenuation value. In various embodiments, object estimator 245 may combine multiple costs associated with a given approximate object height in order to compute a mean-squared cost (MSC) for the approximate object height.

In various embodiments, object estimator 245 may compute separate mean-squared costs for a range of different approximate object heights. Object estimator 245 may then optionally generate a cost function as a best-fit curve for the group of mean-squared costs. For example, upon determining a group of mean-squared costs for a range of approximate object heights between 1 m and 12 m, object estimator 245 may then generate as cost function based on the group of mean-squared costs.

At step 615, estimation device 140, based on the set of costs, estimates an object height for object 160. In various embodiments, object estimator 245 may compare computed mean-squared costs and/or other values included in the cost function in order to determine a single object height as an estimated object height for object 160. In such instances, the estimated height determined by object estimator 245 represents the height of object 160 that would most-likely cause the aggregated set of attenuation values 316. For example, estimation device 140 could compare the group of mean-squared costs and determine a minimum mean-squared cost for the cost function. Object estimator 245 could then determine object height associated with the minimum mean-squared cost and provide this height as the estimated height for object 160.

Location Classification Based on Signal Strength

As described above, one problem with conventional approaches for determining spatial data for objects based on electromagnetic signals being transmitted to a target location is that various types of electromagnetic signals such radio signals may be unreliable to detect and process. A device analyzing such radio signals may, as a result, generate imprecise dimensions for objects in the environment.

Accordingly, in various embodiments disclosed herein, a satellite spatial information system includes an estimation device that, based on information associated with a plurality of satellite positional signals collected at target locations, provides one or more estimated classifications with respect to the position of the mobile device. A mobile device expects to receive satellite positional signals at a given location. The mobile device determines the signal strength of the received positional signal. The estimation device receives messages from one or more mobile devices that received satellite positional signals at the given location. The estimation device aggregates a set of satellite positional signals. The estimation device, based on the aggregated set of satellite positional signals, generates one or more classification thresholds based on signal strength. When a mobile device subsequently receives a satellite positional signal, the mobile device compares the signal strength of the received satellite positional signal to the one or more classification thresholds in order to classify whether the mobile device was located indoors or outdoors when the satellite positional signal was received. In some embodiments, the signal strength is compared to multiple classification thresholds in order to classify a specific floor the mobile device was located when receiving the satellite positional signal. These techniques are described below in further detail in conjunction with FIGS. 7-9.

Figure 7:
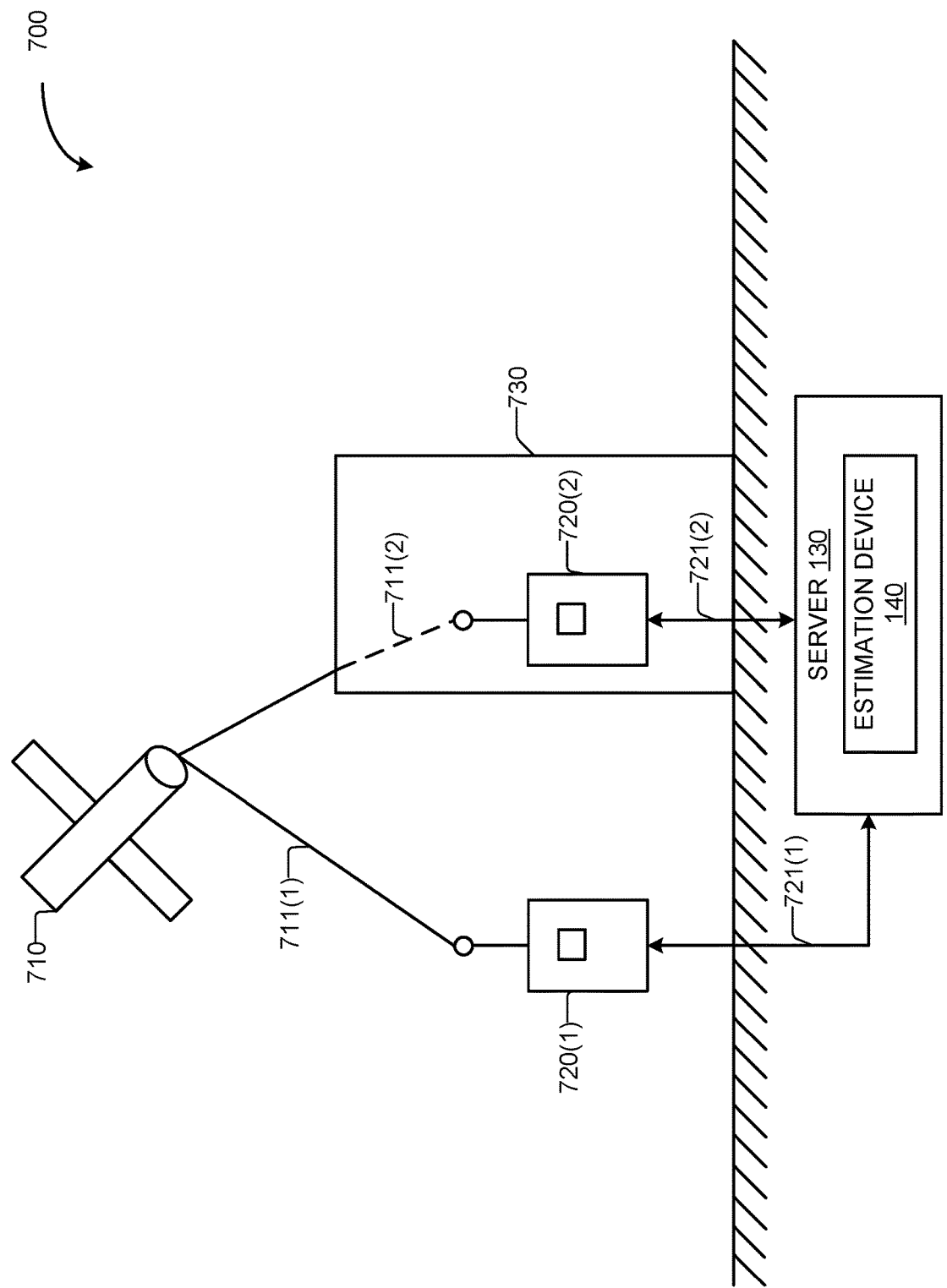
FIG. 7 is another illustration of a satellite spatial information system configured to implement one or more aspects of the present disclosure.

FIG. 7 is another illustration of satellite spatial information system 700 configured to implement one or more aspects of the present disclosure. As shown, satellite spatial information system 700 includes satellite 710, mobile devices 720, building 730, server 130, and estimation device 140.

In operation, satellite 710 broadcasts one or more satellite positional signals 711. One or more mobile devices 720 receive the satellite positional signals 711. Mobile device 720(1), which is located outdoors, receives an unobstructed satellite positional signal 711(1) that has a high signal strength. Mobile device 720(2), which is located inside building 730, receives an obstructed satellite positional signal 711(2). Building 730 causes the satellite positional signal 711(2) to be obstructed such that a signal strength for satellite positional signal 711(2) is attenuated relative to unobstructed satellite positional signal 711(1).

In various embodiments, mobile device 720 may log data associated with the received satellite positional signal 711. For example, mobile device 720(1) may record the associated signal strength of satellite positional signal 711(1). In some embodiments, mobile device 720(1) may also record the time that satellite positional signal 711 was received. In some embodiments, multiple mobile devices 720 may record satellite positional signals 711 sent by satellite 710. In such instances, estimation device 140 may receive multiple messages 721 from the multiple mobile devices 720, where each message 721 that includes data associated with the received satellite positional signals 711.

In some embodiments, messages 721 sent from mobile device 720 to estimation device 140 may include information about mobile device 720, such the device type of mobile device 720. In some embodiments, estimation device 140 may determine aggregate satellite positional signals 711 and/or associated signal strengths based on the device type. For example, different mobile device types could receive the same satellite positional signal 711 at differing signal strengths. In such instances, estimation device 140 may first determine the device type before determining the classification threshold of the signal strength.

In various embodiments, one or more mobile devices 720 may receive satellite positional signal 711 within a specified field of view. For example, one or more mobile devices 720 could filter satellite positional signals 711 to only those satellite positional signals 711 received within a 60° cone (half-angle) in elevation angle around zenith from mobile device 720. In such instances, building 730 is more likely to cause attenuation in the signal strength of satellite positional signal 711 due to mobile device 720(3) receiving satellite positional signal 711(2) while inside building 730.

Figure 8:
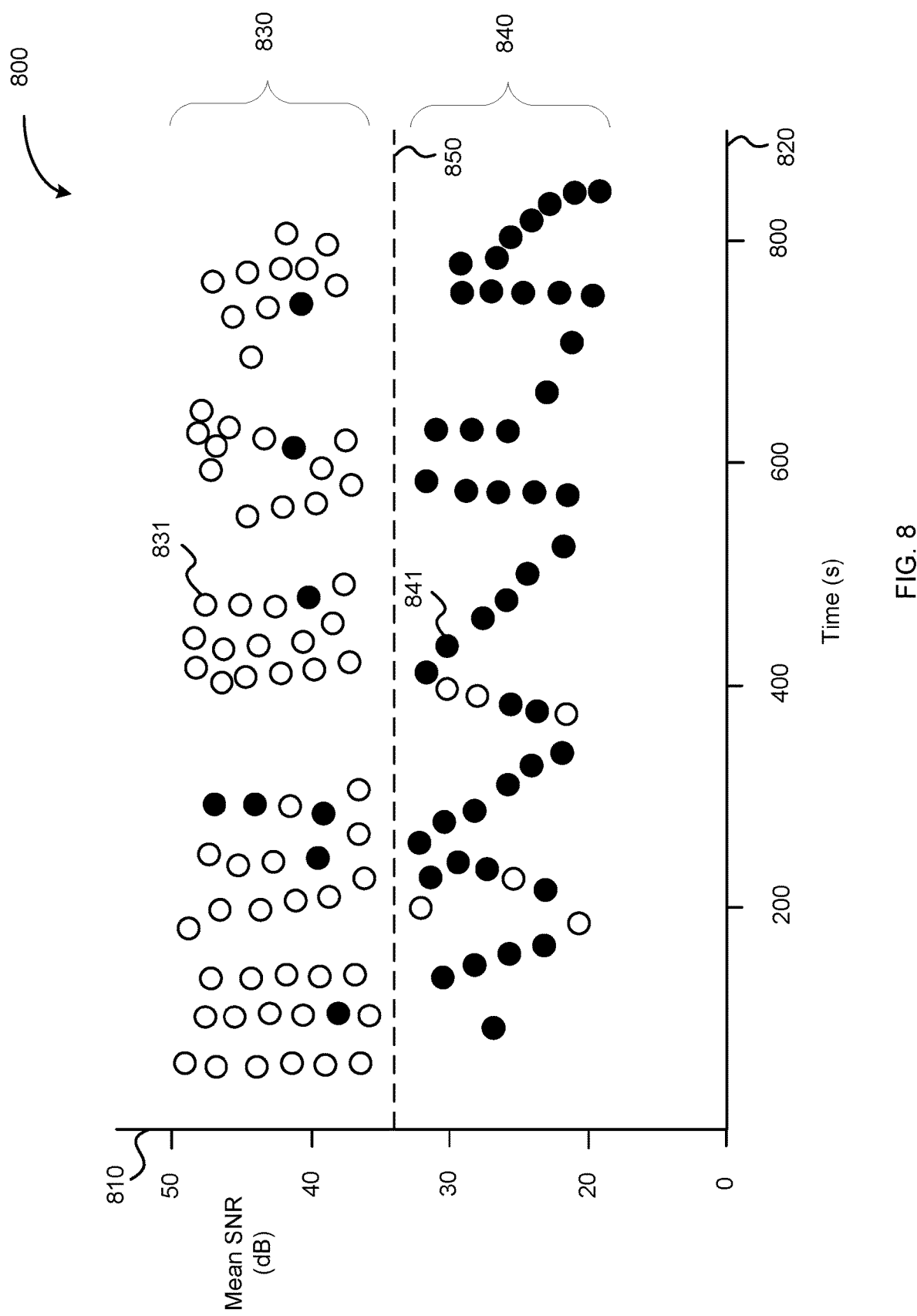
FIG. 8 is a chart illustrating a location classification technique executed by the estimation device of FIG. 7, according to various embodiments of the present disclosure.

FIG. 8 is a chart 800 illustrating a location classification technique executed by the estimation device of FIG. 7, according to various embodiments of the present disclosure. As shown, chart 800 includes classified signal strength sets 830, 840, and classification threshold 850. Each classified signal strength set 830, 840 includes signal strengths, such as outdoor signal strength 831 and indoor signal strength 841.

Chart 800 shows a scatter graph of signal strengths received by one or more mobile devices 720 at a specific location over a specified time period. As shown, chart 800 has an x-axis 820 corresponding to time received and a y-axis 810 corresponding to the signal strength.

In various embodiments, mobile device 720 may receive satellite positional signal 711 and determine an associated signal strength. For example, mobile device 720(1), upon receiving satellite positional signal 711(1) may determine that satellite positional signal 711(1) has a signal-to-noise (SNR) ratio of 50 dB that was received at 500 s after an initial measurement time (e.g., 18:00:00 in coordinated universal time (UTC)). In another example, mobile device 720(2), upon receiving satellite positional signal 711(2) may determine that satellite positional signal 711(1) has a signal-to-noise (SNR) ratio of 50 dB.

Estimation device 140 computes one or more classification threshold 850 that separate an aggregated set of signal strengths into separate groups. For example, classification threshold 850 separates an aggregated set of signal strengths into outdoor-classified signal strength set 830 and indoor-classified signal strength set 840. Estimation device 140 may determine classification threshold 850 that groups the greatest percentage of signal strengths with where mobile device 720 received the associated satellite positional signal 711. For example, estimation device 140 may receive a training data set that specifies the signal strength of a satellite positional signal 711 and a classification of whether mobile device 720 was indoors or outdoors when received. The classification may be a manual user input, or the classification may be based on location data where estimation device 140 determines whether mobile device 720 is within the footprint of building 730.

In various embodiments, one or more values associated with a group may be erroneously classified. For example, outdoor-classified signal strength set 830 includes one or more indoor signal strengths 841, which are associated with satellite positional signals 711 that mobile device 720 received while indoors. In various embodiments, estimation device 140 may receive further signal strengths and may adjust classification threshold 850 based on the additional signal strengths.

Figure 9:
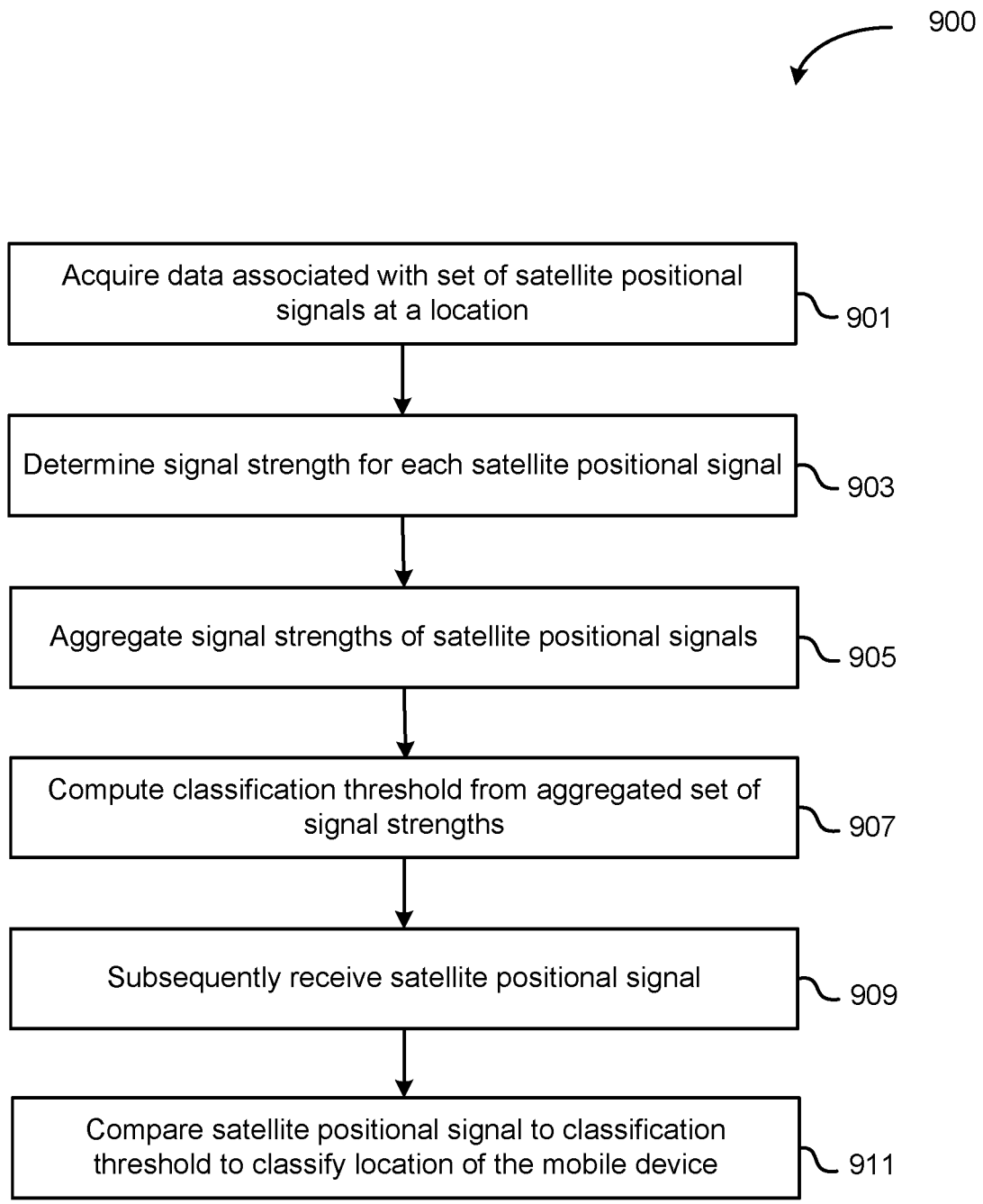
FIG. 9 sets forth a flow diagram of method steps for classifying the location of a sensor using satellite positional signals, according to various embodiments of the disclosure.

FIG. 9 sets forth a flow diagram of method steps for classifying the location of a sensor using satellite positional signals, according to various embodiments of the disclosure. Although the method steps are described in conjunction with FIGS. 1-5 and 7-8, persons of ordinary skill in the art will understand that any system configured to perform this method and/or methods described herein, in any order, and in any combination not logically contradicted, is within the scope of the present invention.

As shown, method 900 begins at step 901, where estimation device 140 acquires data associated with a set of satellite positional signals 711 at a specific location. In various embodiments, one or more satellites 710 transmit, to a specific location, one or more satellite positional signals 711. In such instances, sensors included in one or more mobile devices 720 positioned within the specific location may receive satellite positional signals 711. For example, one mobile device 720(1) could receive a satellite positional signal 711(1) in a direct, line-of-sight path from a transmitter included in satellite 710. In another example, a mobile device 720(2) could receive a satellite positional signal 711(2) that is attenuated due to traveling through building 730.

At step 903, estimation device 140 determines an associated signal strength for each of the satellite positional signals. In various embodiments, mobile device 720 may log data associated with the received satellite positional signal 711, such as the signal strength of satellite positional signal 711, and/or the time that satellite positional signal 711 was received by mobile device 720. In some embodiments, estimation device 140 may receive one or more messages 721 from one or more mobile devices 720 that include the data associated with the received satellite positional signals 711. In some embodiments, the one or more message 721 may include information about mobile device 720, such as the device type of mobile device 720. In some embodiments, estimation device 140 may determine aggregate satellite positional signals 711 and/or associated signal strengths based on the device type. For example, different mobile device types could receive the same satellite positional signal 711 at differing signal strengths. In such instances, estimation device 140 may first determine the device type before determining the classification threshold of the signal strength.

At step 905, estimation device 140 aggregates the associated signal strengths for the satellite positional signals. In various embodiments, estimation device 140 may generate an aggregated set of signal strengths, where each signal strength included in the aggregated set of signal strengths corresponds to a satellite positional signal 711 received by a mobile device 720 at the specific location. In various embodiments, estimation device 140 may aggregate signal strengths of satellite positional signals 711 that were received by a plurality of separate mobile devices 720. In some embodiments, a single mobile device 720 may receive separate satellite positional signals 711 at different times. In such instances, estimation device 140 may include each of the separate signal strengths in the aggregated set of signal strengths.

At step 907, estimation device 140 computes at least one classification threshold from the aggregated set of signal strengths. In various embodiments, estimation device 140 may analyze the aggregated set of signal strengths in order to determine one or more thresholds that indicate likelihood of where mobile device 720 received satellite positional signal 711. For example, a mobile device 720 that receives a satellite positional signal 711 with a lower associated signal strength is more likely to be inside a building. In various embodiments, estimation device 140 may determine one or more thresholds based on separation between groups of signal strengths included in the aggregated set. In such instances, the additional thresholds may be used to classify specific floors of the building.

At step 909, mobile device 720 subsequently receives a satellite positional signal. Upon estimation device 140 determining one or more classification thresholds, mobile device 720 may then receive an additional satellite positional signal 711. For example, mobile device 720(2) may receive satellite positional signal 711(2) while inside building 730. The received satellite positional signal 711(2) could have an associated signal strength that is determined by mobile device 720.

At step 911, one of estimation device 140 or mobile device 720 compares the received satellite positional signal 711(2) to the classification threshold in order to classify the location of mobile device 720. In some embodiments, mobile device 720 may receive the one or more classification thresholds generated by estimation device 140. In such instances, mobile device 720 may compare the associated signal strength of received satellite positional signal 711(2) to the one or more classification thresholds. In some embodiments, estimation device 140 may receive an additional message from mobile device 720(2) that includes information about received satellite positional signal 711(2), including the signal strength of satellite positional signal 711(2). In such instances, estimation device 140 may compare the associated signal strength of received satellite positional signal 711(2) to the one or more classification thresholds and send the result of the classification to mobile device 720.

System Architecture

Figure 10:
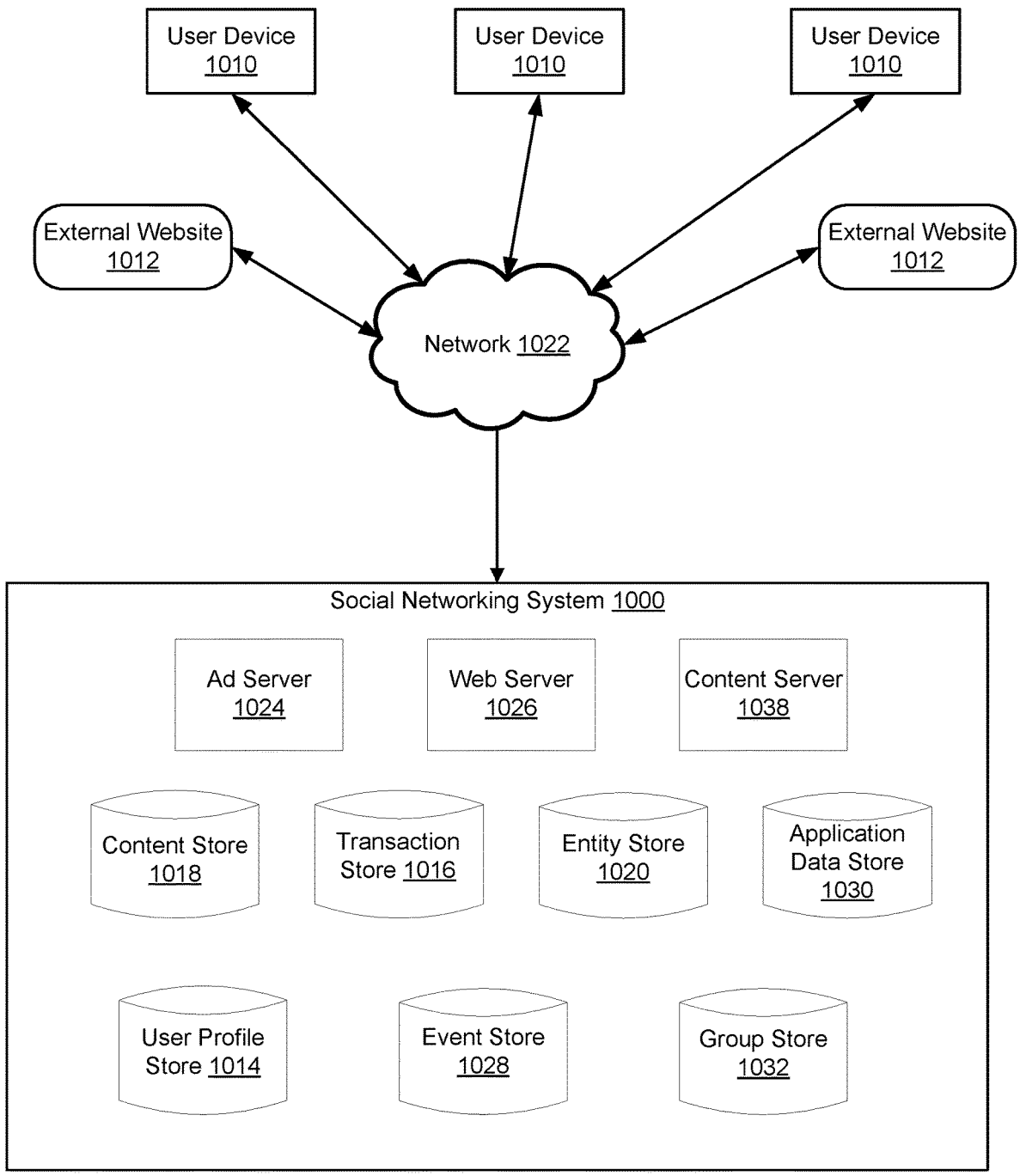
FIG. 10 is a high level block diagram illustrating a system environment suitable for operation of a social networking system 1000.

FIG. 10 is a high-level block diagram illustrating a system environment suitable for operation of a social networking system 1000. The system environment includes one or more user devices 1010, one or more external websites 1012, a social networking system 1000, and a network 1022. In alternative configurations, different and/or additional modules can be included in the system.

The user devices 1010 comprise computing devices that can receive user input and can transmit and receive data via a network 1022. For example, the user devices 1010 may be desktop computers, laptop computers, smart phones, cell phones, personal digital assistants (PDAs), or any other device including computing functionality and data communication capabilities. The user devices 1010 are configured to communicate via network 1022, which may comprise any combination of local area and/or wide area networks, using both wired and wireless communication systems.

FIG. 10 illustrates a block diagram of the social networking system 1000. The social networking system 1000 includes a web server 1026, an ad server 1024, a forward index 1034, a user-term index 1036, a content server 1038, a real time search engine 1040, a user profile store 1014, an entity store 1020, an application data store 1030, a transaction store 1016, a content store 1018, an event store 1028, and a group store 1032. In other embodiments, the social networking system 1000 may include additional, fewer, or different modules for various applications. Conventional components such as network interfaces, security mechanisms, load balancers, failover servers, management and network operations consoles, and the like are not shown so as to not obscure the details of the system.

The social networking system 1000 includes a computing system that allows users to communicate or otherwise interact with each other and access content as described herein. The social networking system 1000 stores in the user profile store 1014 user profiles that describe the users of a social networking system, including biographic, demographic, and other types of descriptive information, such as work experience, educational history, hobbies, interests, location, and the like.

Additionally, the user profile store 1014 includes connections between different users and other nodes within and outside of the social networking system, and may also allow users to specify their relationships with others. For example, these user connections allow users to generate relationships with other users that parallel the users' real-life relationships, such as connections, co-workers, partners, and so forth. Users may select from predefined types of relationships, define their own relationship types as needed, or do nothing at all. Regardless, the system tracks and stores all of these relationships. Privacy settings may be implemented by the social networking system to enable users to publish posts to user-specified connections and/or groups of connections. These privacy settings may be configured by the user based upon the relationship types defined by the user or by groups of connections selected by the user. As a result of these privacy settings, certain posts may be limited to specified connections and/or groups of connections.

A user (or other type of node) may have a particular affinity, which may be represented by an affinity score, for another node on a social networking system. In this context, an affinity score indicates the strength of correlation or interest between a user and another node in the social networking system (or the Internet at large). Affinity scores for a user's connections are stored in the user profile object for that user in the user profile store 1014. As indicated above, a node may be a user, entity, or any other object with which a user may engage and interact on or through a social networking system. Methods for determining affinities between users of a social networking system are described further in U.S. application Ser. No. 11/503,093, filed Aug. 11, 2006, which is hereby incorporated by reference in its entirety.

The social networking system 1000 maintains (or uses a third party to maintain) data in a database about a number of different types of objects with which a user may interact on the social networking system 1000, including posts, entities, events, applications, groups, transactions, etc. To this end, each of the user profile store 1014, the content store 1018, the entity store 1020, the event store 1028, the application data store 1030, the group store 1032, and the transaction store 1016 stores a data structure in a database to manage the data for each instance of the corresponding type of object maintained by the website 1000. The data structures comprise information fields that are suitable for the corresponding type of object. For example, the event store 1028 contains data structures that include the time and location for an event, whereas the user profile store 1014 contains data structures with fields suitable for describing a user's profile. When a new object of a particular type is created, the service 1000 initializes a new data structure of the corresponding type, assigns a unique object identifier to it, and begins to add data to the object as needed. Thus, when a user makes a new post, such as providing a photograph, the social networking system 1000 generates a new instance of a post object in the content store 1018, assigns a unique identifier to the post, begins to populate the fields of the post with information provided by the user, such as who is tagged in the photo. Subsequently after the post is made, users interacting with the post, can add further information to the data structure, such as comments and other tags created by other users.

An ad server 1024 generates and delivers advertisements to user devices 1010. In one embodiment, an ad server 1024 may access the various filters created by users and/or automatically created by the social networking system 1000. An analysis of the filters may help advertisers develop better marketing campaigns through more selective targeting techniques utilizing information about users' preferred filters. Targeting advertisements are further described in a related application, U.S. application Ser. No. 12/195,321, filed Aug. 20, 2008, which is hereby incorporated by reference in its entirety.

The web server 1026 links the social networking system 1000 via the network 1022 to one or more user devices 1010; the web server 1026 serves web pages, as well as other web-related content, such as Java, Flash, XML, and so forth. The web server 1026 may include a mail server or other messaging functionality for receiving and routing messages between the social networking system 1000 and the user devices 1010. The messages can be instant messages, queued messages (e.g., email), text and SMS messages, or any other suitable messaging technique. In another embodiment, the social networking system is implemented on an application running on a user device 1010 that accesses information from the social networking system using APIs or other communication mechanisms. A content server 1038 serves the posts to the user when the user logs into the social networking system 1000.

In sum, an estimation device receives data associated with one or more satellites positional signals transmitting positional signals to mobile devices in an environment. The estimation device then makes various spatial determinations based on the positional signals.

In some embodiments, one or more satellites transmit information about a set of expected satellite positional signals that are to be sent to a specific location. An expected satellite positional signal, when transmitted by the satellite is to form a ray between the satellite and a receiving sensor at the specific location. When the satellite transmits a satellite positional signal to the specific location, the sensor attempts to receive the satellite positional signal. The estimation device receives satellite information that includes characteristics for the expected satellite positional signals and mobile device data that includes characteristics for the observed satellite positional signals that were received by the sensor. The characteristics of the satellite positional signals include the signal strength, and angles in which the signals travelled.

The estimation device determines the ray formed from the observed satellite positional signal travelling from satellite to the sensor. The estimation device, based on the position of the sensor and the satellite, computes an approximate height for an object at the specific location that is positioned between the sensor and the satellite, and whose edge would intersect the ray. The estimation device may compute a signal strength difference between the expected satellite positional signal and the observed satellite positional signal in order to determine the accuracy of a given approximate object height. The estimation device then aggregates a set of aggregate object heights and computes costs associated with each approximate object height. The estimation device determines an object height from the computed costs such that the cost associated with a single estimated height is minimized. The estimation device provides the determined object height as an estimated height for the object at the specific location.

In some embodiments, a mobile device expects to receive satellite positional signals at a given location. The mobile device, upon receiving the positional signal, determines the signal strength of the received positional signal. An estimation device receives messages from one or more mobile devices that received satellite positional signals at the given location. The estimation device aggregates a set of satellite positional signals. The estimation device, based on the aggregated set of satellite positional signals, generates one or more classification thresholds based on signal strength. When a mobile device subsequently receives a satellite positional signal, the mobile device compares the signal strength of the received satellite positional signal to the one or more classification thresholds in order to classify whether the mobile device was located indoors or outdoors when the satellite positional signal was received. In some embodiments, the signal strength is compared to multiple classification thresholds in order to classify a specific floor the mobile device was located when receiving the satellite positional signal.

At least one technological advantage of the disclosed techniques relative to prior techniques is that the system is able to aggregate a large volume of measurements associated with satellite-based positional signals in order to determine spatial information. Aggregating such data enables the system to provide highly accurate estimations about the location of sensors, as well as other objects within a target area. Consequently, the system is able to use an aggregate of estimated dimensional values in order to provide precise estimated heights of objects. Further, the system is able to provide accurate classifications about the position of a sensor based on previous sensor data.

1. In various embodiments, a computer-implemented method, comprises aggregating positional signals that were received, via a network, from a plurality of device sensors, where each positional signal has an associated observed signal strength, identifying a subset of the positional signals associated with a physical location, where each positional signal included in the subset of the positional signals was received by a given device sensor while the device sensor was located within a threshold distance of the physical location, for each positional signal included in the subset of the positional signals, generating, by an estimation device and based at least on a position of the device sensor that received the positional signal, a corresponding approximate object height for an object located at the physical location, for each approximate object height corresponding to the subset of the positional signals, determining an expected signal strength for the positional signal corresponding to the approximate object height, generating, by the estimation device, a cost value that is based on a difference between the expected signal strength and the observed signal strength associated with the positional signal corresponding to the approximate object height, and determining, by the estimation device and based on the cost values, an estimated object height for the object.

2. The computer-implemented method of clause 1, where determining the corresponding approximate object height comprises computing a ray associated with a direct-line path of the positional signal, determining an object position of the object relative to the position of the given device sensor, and determining, based on the object position, the approximate object height that would cause at least a portion of the object to intersect with the ray.

3. The computer-implemented method of clause 1 or 2, further comprising determining an expected positional signal having a second expected signal strength that the given device sensor was to receive at the physical location, wherein the given device sensor did not receive the expected positional signal, determining, for the expected positional signal and based at least on a position of the given device sensor, a corresponding approximate object height for the object, and generating a missing cost value based on a difference between the second expected signal strength.

4. The computer-implemented method of any of clauses 1-3, further comprising generating, from the cost values, a cost function of approximate object heights, where determining the estimated object height comprises determining an object height associated with a minimum value of the cost function.

5. The computer-implemented method of any of clauses 1-4, further comprising receiving positional information about one or more transmitting devices that transmitted the positional signals, and computing a plurality of rays associated with direct-line paths of the positional signals from the transmitting devices to the device sensors.

6. The computer-implemented method of any of clauses 1-5, where identifying the subset of the positional signals is based at least on a set of azimuth angles of the rays associated with the subset of the positional signals.

7. The computer-implemented method of any of clauses 1-6, where each cost value is further based on device types of a plurality of devices that include the plurality of device sensors.

8. In various embodiments, one or more non-transitory computer-readable media include instructions that, when executed by one or more processors, cause the one or more processors to perform the steps of aggregating positional signals that were received, via a network, from a plurality of device sensors, where each positional signal has an associated observed signal strength, identifying a subset of the positional signals associated with a physical location, where each positional signal included in the subset of the positional signals was received by a given device sensor while the device sensor was located within a threshold distance of the physical location, for each positional signal included in the subset of the positional signals, generating, by an estimation device and based at least on a position of the device sensor that received the positional signal, a corresponding approximate object height for an object located at the physical location, for each approximate object height corresponding to the subset of the positional signals, determining an expected signal strength for the positional signal corresponding to the approximate object height, generating, by the estimation device, a cost value that is based on a difference between the expected signal strength and the observed signal strength associated with the positional signal corresponding to the approximate object height, and determining, by the estimation device and based on the cost values, an estimated object height for the object.

9. The one or more non-transitory computer-readable media of clause 8, where determining the corresponding approximate object height comprises computing a ray associated with a direct-line path of the positional signal, determining an object position of the object relative to the position of the given device sensor, and determining, based on the object position, the approximate object height that would cause at least a portion of the object to intersect with the ray.

10. The one or more non-transitory computer-readable media of clause 8 or 9, further including instructions that, when executed by the one or more processors, cause the one or more processors to perform the steps of determining an expected positional signal having a second expected signal strength that the given device sensor was to receive at the physical location, wherein the given device sensor did not receive the expected positional signal, determining, for the expected positional signal and based at least on a position of the given device sensor, a corresponding approximate object height for the object, and generating a cost value based on a difference between the second expected signal strength.

11. The one or more non-transitory computer-readable media of any of clauses 8-10, further including instructions that, when executed by the one or more processors, cause the one or more processors to perform the steps of generating, from the cost values, a cost function of approximate object heights, where determining the estimated object height comprises determining an object height associated with a minimum value of the cost function.

12. The one or more non-transitory computer-readable media of any of clauses 8-11, further including instructions that, when executed by the one or more processors, cause the one or more processors to perform the steps of receiving positional information about one or more transmitting devices that transmitted the positional signals, and computing a plurality of rays associated with direct-line paths of the positional signals from the transmitting devices to the device sensors.

13. The one or more non-transitory computer-readable media of any of clauses 8-12, where identifying the subset of the positional signals is based at least on a set of azimuth angles of the rays associated with the subset of the positional signals.

14. In various embodiments, a computing system comprises a plurality of device sensors that receive positional signals, and an estimation device that, aggregate the positional signals that were received, via a network, from the plurality of device sensors, where each positional signal has an associated observed signal strength, identify a subset of the positional signals associated with a physical location, wherein each positional signal included in the subset of the positional signals was received by a given device sensor while the device sensor was located within a threshold distance of the physical location, for each positional signal included in the subset of the positional signals, generating, based at least on a position of the device sensor that received the positional signal, a corresponding approximate object height for an object located at the physical location, for each approximate object height corresponding to the subset of the positional signals, determining an expected signal strength for the positional signal corresponding to the approximate object height, generating a cost value that is based on a difference between the expected signal strength and the observed signal strength associated with the positional signal corresponding to the approximate object height, and determining, based on the cost values, an estimated object height for the object.

15. The computing system of clause 14, where the estimation device determines the corresponding approximate object height by computing a ray associated with a direct-line path of the positional signal, determining an object position of the object relative to the position of the given device sensor, and determining, based on the object position, the approximate object height that would cause at least a portion of the object to intersect with the ray.

16. The computing system of clause 14 or 15, where the estimation device further determines an expected positional signal having a second expected signal strength that the given device sensor was to receive at the physical location, wherein the given device sensor did not receive the expected positional signal, determines, for the expected positional signal and based at least on a position of the given device sensor, a corresponding approximate object height for the object, and generates a missing cost value based on a difference between the second expected signal strength.

17. The computing system of any of clauses 14-16, further comprising one or more transmitting devices that transmit the positional signals, where the estimation device receives positional information about the one or more transmitting devices, and computes a plurality of rays associated with direct-line paths of the positional signals from the transmitting devices to the device sensors.

18. The computing system of any of clauses 14-17, where the one or more transmitting devices comprise one or more global navigation satellite system (GNSS) satellites.

19. The computing system of any of clauses 14-18, further comprising a server that communicates with at least one of the one or more transmitting devices or the plurality of device sensors, wherein the server is separate from the plurality of device sensors, and where the estimation device is included in the server.

20. The computing system of any of clauses 14-19, further comprising a plurality of devices that include the plurality of device sensors, where the cost value is further based on device types of the plurality of devices.

21. In various embodiments, a computer-implemented method comprises aggregating, by an estimation device, positional signals that were received from a plurality of device sensors, wherein each positional signal has an associated signal strength, generating, by the estimation device from the aggregated set of the positional signals, an aggregated set of signal strengths, determining, from the aggregated set of signal strengths, a first classification threshold, after determining the first classification threshold, receiving, by the estimation device, a first positional signal that is not included in the aggregated set of the positional signals, where the first positional signal has an associated first signal strength, comparing the first positional signal to the first classification threshold, and when the first signal strength is above the first classification threshold, classifying the first positional signal as being received by the sensor device while outdoors, or when the first signal strength is below the first classification threshold, classifying the first positional signal as being received by the sensor while indoors.

22. The computer-implemented method of claim 21, where a mobile device includes at least one device sensor included in the plurality of device sensors, and the mobile device classifies the first positional signal.

23. The computer-implemented method of clauses 21 or 22, where the plurality of device sensors are included in separate mobile devices.

24. The computer-implemented method of any of clauses 21-23, further comprising computing, based on the aggregated set of signal strengths, a set of classification thresholds, where each classification threshold included in the set of classification thresholds is associated with classifying a floor within a building in which the plurality of sensor devices received the positional signals included in the aggregated set of the positional signals, and wherein the first classification threshold is included in the set of classification thresholds.

25. The computer-implemented method of any of clauses 21-24, further comprising identifying a subset of the positional signals associated with a device type of a plurality of devices that include the plurality of device sensors, where the aggregated set of signal strengths is based on the subset of the positional signals.

26. In various embodiments, one or more non-transitory computer-readable media include instructions that, when executed by one or more processors, cause the one or more processors to perform the steps of aggregating, by an estimation device, positional signals that were received from a plurality of device sensors, wherein each positional signal has an associated signal strength, generating, by the estimation device from the aggregated set of the positional signals, an aggregated set of signal strengths, determining, from the aggregated set of signal strengths, a first classification threshold, after determining the first classification threshold, receiving, by the estimation device, a first positional signal that is not included in the aggregated set of the positional signals, wherein the first positional signal has an associated first signal strength, comparing the first positional signal to the first classification threshold, and when the first signal strength is above the first classification threshold, classifying the first positional signal as being received by the sensor device while outdoors, or when the first signal strength is below the first classification threshold, classifying the first positional signal as being received by the sensor while indoors.

27. The one or more non-transitory computer-readable media of claim 26, where a mobile device includes at least one device sensor included in the plurality of device sensors, and the mobile device classifies the first positional signal.

28. The one or more non-transitory computer-readable media of claim 26 or 27, where the plurality of device sensors are included in separate mobile devices.

29. The one or more non-transitory computer-readable media of any of clauses 26-28, further including instructions that, when executed by the one or more processors, cause the one or more processors to perform the steps of computing, based on the aggregated set of signal strengths, a set of classification thresholds, where each classification threshold included in the set of classification thresholds is associated with classifying a floor within a building in which the plurality of sensor devices received the positional signals included in the aggregated set of the positional signals, and where the first classification threshold is included in the set of classification thresholds.

30. The one or more non-transitory computer-readable media of any of clauses 26-29, further including instructions that, when executed by the one or more processors, cause the one or more processors to perform the steps of identifying a subset of the positional signals associated with a device type of a plurality of devices that include the plurality of device sensors, where the aggregated set of signal strengths is based on the subset of the positional signals.

31. A computing system comprising a plurality of device sensors that receive positional signals, and an estimation device that aggregates the positional signals that were received from the plurality of device sensors, where each positional signal has an associated signal strength, generates, from the aggregated set of the positional signals, an aggregated set of signal strengths, determines, from the aggregated set of signal strengths, a first classification threshold, after determining the first classification threshold, receives a first positional signal that is not included in the aggregated set of the positional signals, wherein the first positional signal has an associated first signal strength, compares the first positional signal to the first classification threshold, and when the first signal strength is above the first classification threshold, classifies the first positional signal as being received by the sensor device while outdoors, or when the first signal strength is below the first classification threshold, classifies the first positional signal as being received by the sensor while indoors.

32. The computing system of clause 31, further comprising a mobile device that includes at least one device sensor included in the plurality of device sensors, where the mobile device classifies the first positional signal.

33. The computing system of clause 31 or 32, further comprising a plurality of mobile devices, where the plurality of device sensors are included in separate mobile devices.

34. The computing system of any of clauses 31-33, where the estimation device further computes, based on the aggregated set of signal strengths, a set of classification thresholds, where each classification threshold included in the set of classification thresholds is associated with classifying a floor within a building in which the plurality of sensor devices received the positional signals included in the aggregated set of the positional signals, and where the first classification threshold is included in the set of classification thresholds.

35. The computing system of any of clauses 31-34, wherein the estimation device further identifies a subset of the positional signals associated with a device type of a plurality of devices that include the plurality of device sensors, where the aggregated set of signal strengths is based on the subset of the positional signals.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent one or more modules, segments, or portions of code, which each comprise one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
aggregating positional signals that were received, via a network, from a plurality of device sensors, wherein each positional signal has an associated observed signal strength;

identifying a subset of the positional signals associated with a physical location, wherein each positional signal included in the subset of the positional signals was received by a given device sensor of the plurality of device sensors while the given device sensor was located within a threshold distance of the physical location;

for each positional signal included in the subset of the positional signals, generating, by an estimation device and based at least on a position of the given device sensor that received the positional signal, a corresponding approximate object height for an object located at the physical location;

for each approximate object height corresponding to the subset of the positional signals:
  determining an expected signal strength for the positional signal corresponding to the approximate object height,
  generating, by the estimation device, a cost value that is based on a difference between the expected signal strength and the observed signal strength associated with the positional signal corresponding to the approximate object height; and determining, by the estimation device and based on the cost values, an estimated object height for the object.

2. The computer-implemented method of claim 1, wherein determining the corresponding approximate object height comprises:
  computing a ray associated with a direct-line path of the positional signal;
  determining an object position of the object relative to the position of the given device sensor; and
  determining, based on the object position, the approximate object height that would cause at least a portion of the object to intersect with the ray.

3. The computer-implemented method of claim 1, further comprising:
  determining an expected positional signal having a second expected signal strength that the given device sensor was to receive at the physical location, wherein the given device sensor did not receive the expected positional signal;
  determining, for the expected positional signal and based at least on a position of the given device sensor, a corresponding approximate object height for the object; and
  generating a missing cost value based on a difference between the second expected signal strength and the observed signal strength.

4. The computer-implemented method of claim 1, further comprising:
  generating, from the cost values, a cost function of approximate object heights,
  wherein determining the estimated object height comprises determining an object height associated with a minimum value of the cost function.

5. The computer-implemented method of claim 1, further comprising:
  receiving positional information about one or more transmitting devices that transmitted the positional signals; and
  computing a plurality of rays associated with direct-line paths of the positional signals from the transmitting devices to the plurality of device sensors.

6. The computer-implemented method of claim 5, wherein identifying the subset of the positional signals is based at least on a set of azimuth angles of the rays associated with the subset of the positional signals.

7. The computer-implemented method of claim 1, wherein each cost value is further based on device types of a plurality of devices that include the plurality of device sensors.

8. One or more non-transitory computer-readable media including instructions that, when executed by one or more processors, cause the one or more processors to perform the steps of:
  aggregating positional signals that were received, via a network, from a plurality of device sensors, wherein each positional signal has an associated observed signal strength;
  identifying a subset of the positional signals associated with a physical location, wherein each positional signal included in the subset of the positional signals was received by a given device sensor of the plurality of device sensors while the given device sensor was located within a threshold distance of the physical location;
  for each positional signal included in the subset of the positional signals, generating, by an estimation device and based at least on a position of the given device sensor that received the positional signal, a corresponding approximate object height for an object located at the physical location;
  for each approximate object height corresponding to the subset of the positional signals:
    determining an expected signal strength for the positional signal corresponding to the approximate object height,
    generating, by the estimation device, a cost value that is based on a difference between the expected signal strength and the observed signal strength associated with the positional signal corresponding to the approximate object height; and
  determining, by the estimation device and based on the cost values, an estimated object height for the object.

9. The one or more non-transitory computer-readable media of claim 8, wherein determining the corresponding approximate object height comprises:
  computing a ray associated with a direct-line path of the positional signal;
  determining an object position of the object relative to the position of the given device sensor; and
  determining, based on the object position, the approximate object height that would cause at least a portion of the object to intersect with the ray.

10. The one or more non-transitory computer-readable media of claim 8, further including instructions that, when executed by the one or more processors, cause the one or more processors to perform the steps of:
  determining an expected positional signal having a second expected signal strength that the given device sensor was to receive at the physical location, wherein the given device sensor did not receive the expected positional signal;
  determining, for the expected positional signal and based at least on a position of the given device sensor, a corresponding approximate object height for the object; and
  generating a cost value based on a difference between the second expected signal strength and the observed signal strength.

11. The one or more non-transitory computer-readable media of claim 8, further including instructions that, when executed by the one or more processors, cause the one or more processors to perform the steps of:
- generating, from the cost values, a cost function of approximate object heights,
- wherein determining the estimated object height comprises determining an object height associated with a minimum value of the cost function.

12. The one or more non-transitory computer-readable media of claim 8, further including instructions that, when executed by the one or more processors, cause the one or more processors to perform the steps of:
- receiving positional information about one or more transmitting devices that transmitted the positional signals; and
- computing a plurality of rays associated with direct-line paths of the positional signals from the transmitting devices to the plurality of device sensors.

13. The one or more non-transitory computer-readable media of claim 12, wherein identifying the subset of the positional signals is based at least on a set of azimuth angles of the rays associated with the subset of the positional signals.

14. A computing system, comprising:
- a plurality of device sensors that receive positional signals; and
- an estimation device configured to:
  - aggregate the positional signals that were received, via a network, from the plurality of device sensors, wherein each positional signal has an associated observed signal strength;
  - identify a subset of the positional signals associated with a physical location, wherein each positional signal included in the subset of the positional signals was received by a given device sensor of the plurality of device sensors while the given device sensor was located within a threshold distance of the physical location;
  - for each positional signal included in the subset of the positional signals, generate, based at least on a position of the given device sensor that received the positional signal, a corresponding approximate object height for an object located at the physical location;
  - for each approximate object height corresponding to the subset of the positional signals:
    - determine an expected signal strength for the positional signal corresponding to the approximate object height,
    - generate a cost value that is based on a difference between the expected signal strength and the observed signal strength associated with the positional signal corresponding to the approximate object height; and
  - determine, based on the cost values, an estimated object height for the object.

15. The computing system of claim 14, wherein the estimation device determines the corresponding approximate object height by:
- computing a ray associated with a direct-line path of the positional signal;
- determining an object position of the object relative to the position of the given device sensor; and
- determining, based on the object position, the approximate object height that would cause at least a portion of the object to intersect with the ray.

16. The computing system of claim 14, wherein the estimation device further:
- determines an expected positional signal having a second expected signal strength that the given device sensor was to receive at the physical location, wherein the given device sensor did not receive the expected positional signal;
- determines, for the expected positional signal and based at least on a position of the given device sensor, a corresponding approximate object height for the object; and
- generates a missing cost value based on a difference between the second expected signal strength and the observed signal strength.

17. The computing system of claim 14, further comprising: one or more transmitting devices that transmit the positional signals, wherein the estimation device: receives positional information about the one or more transmitting devices; and computes a plurality of rays associated with direct-line paths of the positional signals from the transmitting devices to the plurality of device sensors.

18. The computing system of claim 17, wherein the one or more transmitting devices comprise one or more global navigation satellite system (GNSS) satellites.

19. The computing system of claim 17, further comprising:
- a server that communicates with at least one of the one or more transmitting devices or the plurality of device sensors,
- wherein the server is separate from the plurality of device sensors, and
- wherein the estimation device is included in the server.

20. The computing system of claim 14, further comprising:
- a plurality of devices that include the plurality of device sensors,
- wherein the cost value is further based on device types of the plurality of devices.

* * * * *